US009173209B2

(12) United States Patent
Prakash et al.

(10) Patent No.: US 9,173,209 B2
(45) Date of Patent: Oct. 27, 2015

(54) SUBFRAME CONFIGURATION MANAGEMENT IN LTE HETNETS WITH TIME DOMAIN EICIC AND VOIP

(71) Applicant: QUALCOMM Incorporated, San Diego, CA (US)

(72) Inventors: Rajat Prakash, San Diego, CA (US); Durga Prasad Malladi, San Diego, CA (US); Vikas Jain, San Diego, CA (US); Ajay Gupta, San Diego, CA (US); Madhavan Srinivasan Vajapeyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 13/939,168

(22) Filed: Jul. 10, 2013

(65) Prior Publication Data

US 2014/0016582 A1  Jan. 16, 2014

Related U.S. Application Data

(60) Provisional application No. 61/671,089, filed on Jul. 12, 2012.

(51) Int. Cl.
*H04W 72/04* (2009.01)
*H04W 76/04* (2009.01)
*H04W 36/00* (2009.01)

(52) U.S. Cl.
CPC ...... *H04W 72/0406* (2013.01); *H04W 36/0083* (2013.01); *H04W 76/048* (2013.01)

(58) Field of Classification Search
None
See application file for complete search history.

(56) References Cited

U.S. PATENT DOCUMENTS

| | | | |
|---|---|---|---|
| 2012/0108177 A1* | 5/2012 | Miao et al. | 455/67.11 |
| 2012/0113812 A1* | 5/2012 | Ji et al. | 370/241 |
| 2012/0113843 A1* | 5/2012 | Watfa et al. | 370/252 |
| 2012/0113850 A1* | 5/2012 | Fu et al. | 370/252 |
| 2012/0252487 A1* | 10/2012 | Siomina et al. | 455/456.1 |
| 2013/0044704 A1 | 2/2013 | Pang et al. | |
| 2013/0045740 A1 | 2/2013 | Gayde et al. | |
| 2013/0045770 A1* | 2/2013 | Aschan et al. | 455/522 |
| 2013/0142175 A1* | 6/2013 | Manssour et al. | 370/336 |
| 2013/0315092 A1* | 11/2013 | Yu et al. | 370/252 |
| 2013/0329636 A1* | 12/2013 | Jiang et al. | 370/328 |

OTHER PUBLICATIONS

Samsung, Further Consideration on eICIC ABS pattern, R4-110260, 3GPP TSG RAN WG4 #57AH, Austin, US, Jan. 17-21, 2011, pp. 1-3.*

(Continued)

*Primary Examiner* — Benjamin Lamont
(74) *Attorney, Agent, or Firm* — Arent Fox LLP

(57) ABSTRACT

A method, an apparatus, and a computer program product for wireless communication where a macro eNB or similar device may be configured to adjust an ABS configuration that is used for designating ABS subframes are provided to provide a VoLTE service to a UE. The ABS configuration may be adjusted by imposing one or more restrictions, such as alignment of the DRX OnDuration of a UE with some offset to the serving cell non-ABS subframes, and imposing restrictions on the ABS subframe settings at the macro eNB. The method or apparatus may initiate or terminate a wireless communication feature for a UE, and may adjust an ABS configuration based on the wireless communication feature, such that a maximum limit is set on a number of ABS subframes or a minimum limit is set on a number of non-ABS subframes based on the wireless communication feature.

64 Claims, 19 Drawing Sheets

(56) References Cited

OTHER PUBLICATIONS

Renesas Mobile Europe Ltd., Using DRX with eICIC, R2-121658, 3GPP TSG RAN WG2 Meeting #77bis, Jeju, South Korea, Mar. 26-30, 2012, pp. 1-3.*

Damnjanovic A., et al., "UE's Role in LTE Advanced Heterogeneous Networks," IEEE Communications Magazine, LTE-Advanced and 4G Wireless Communications, Feb. 2012, pp. 164-176.

Ericsson et al: "Analysis of patterns and their impact on intrafrequency requirements for eiCIC", 3GPP Draft; R4-104433 Analysis of Patterns and Their Impact on Intra-Frequency Requirements for EICIC, 3rd Generation Partnership Project (3GPP), Mobile Competence Centre ; 650, Route Des Lucioles ; F-06921 Sophia-Antipolis Cedex; France, vol. RAN WG4, no. Jacksonville; 20101115, Nov. 12, 2010, XP050499829.

Huawei et al: "Consideration on DRX in eICIC scenario", 3GPP Draft; R2-111021, 3rd Generation Partnership Project (3GPP), Mobile Competence Centre; 650, Route Des Lucioles; F-06921 Sophia-Antipolis Cedex; France, vol. RAN WG2, no. Taipei, Taiwan; 20110221, Feb. 14, 2011, XP050493546, [retrieved on Feb. 14, 2011] chapter 1, chapter 2.1.

International Search Report and Written Opinion—PCT/US2013/050132—ISA/EPO—Dec. 5, 2013.

Samsung: "Discussion on RLM for Time-Domain eICIC", 3GPP Draft; R4-104161, 3rd Generation Partnership Project (3GPP), Mobile Competence Centre ; 650, Route Des Lucioles ; F-06921 Sophia-Antipolis Cedex ; France, vol. RAN WG4, no. Jacksonville; 20101115, Nov. 12, 2010, XP050499813.

Samsung: "Further consideration on eICIC ABS pattern", 3GPP Draft; R4-110260, 3rd Generation Partnership Project (3GPP), Mobile Competence Centre; 650, Route Des Lucioles; F-06921 Sophia-Antipolis Cedex; France, vol. RAN WG4, no. Austin; 20110117, Jan. 11, 2011, XP050500241, [retrieved on Jan. 11, 2011] chapter 1, chapter 2, chapter 3.

* cited by examiner

SUBFRAME CONFIGURATION MANAGEMENT IN LTE HETNETS WITH TIME DOMAIN EICIC AND VOIP

CROSS-REFERENCE TO RELATED APPLICATIONS

This application claims the benefit of U.S. Provisional Application Ser. No. 61/671,089, entitled "SUBFRAME CONFIGURATION MANAGEMENT IN LTE HETNETS WITH TIME DOMAIN EICIC AND VOIP" and filed on Jul. 12, 2012, which is expressly incorporated by reference herein in its entirety.

BACKGROUND

1. Field

The present disclosure relates generally to communication systems, and more particularly, to subframe configuration management in Long Term Evolution (LTE) heterogeneous networks (HetNets) with time domain enhanced inter-cell interference coordination (eICIC) and voice over Internet Protocol (VoIP).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are whereby a macro eNB or similar device may be configured to adjust an ABS configuration that is used for designating ABS subframes, to properly provide a VoLTE service to a UE. The ABS configuration may be adjusted by imposing one or more restrictions, such as alignment of the DRX OnDuration of a UE with some offset to the serving cell non-ABS subframes, and imposing restrictions on the ABS subframe settings at the macro eNB.

The method or apparatus may initiate or terminate a wireless communication feature for a UE, and may adjust a first ABS configuration based on the wireless communication feature, such that a maximum limit is set on a number of ABS subframes or a minimum limit is set on a number of non-ABS subframes based on the wireless communication feature.

DETAILED DESCRIPTION

Figure 1:
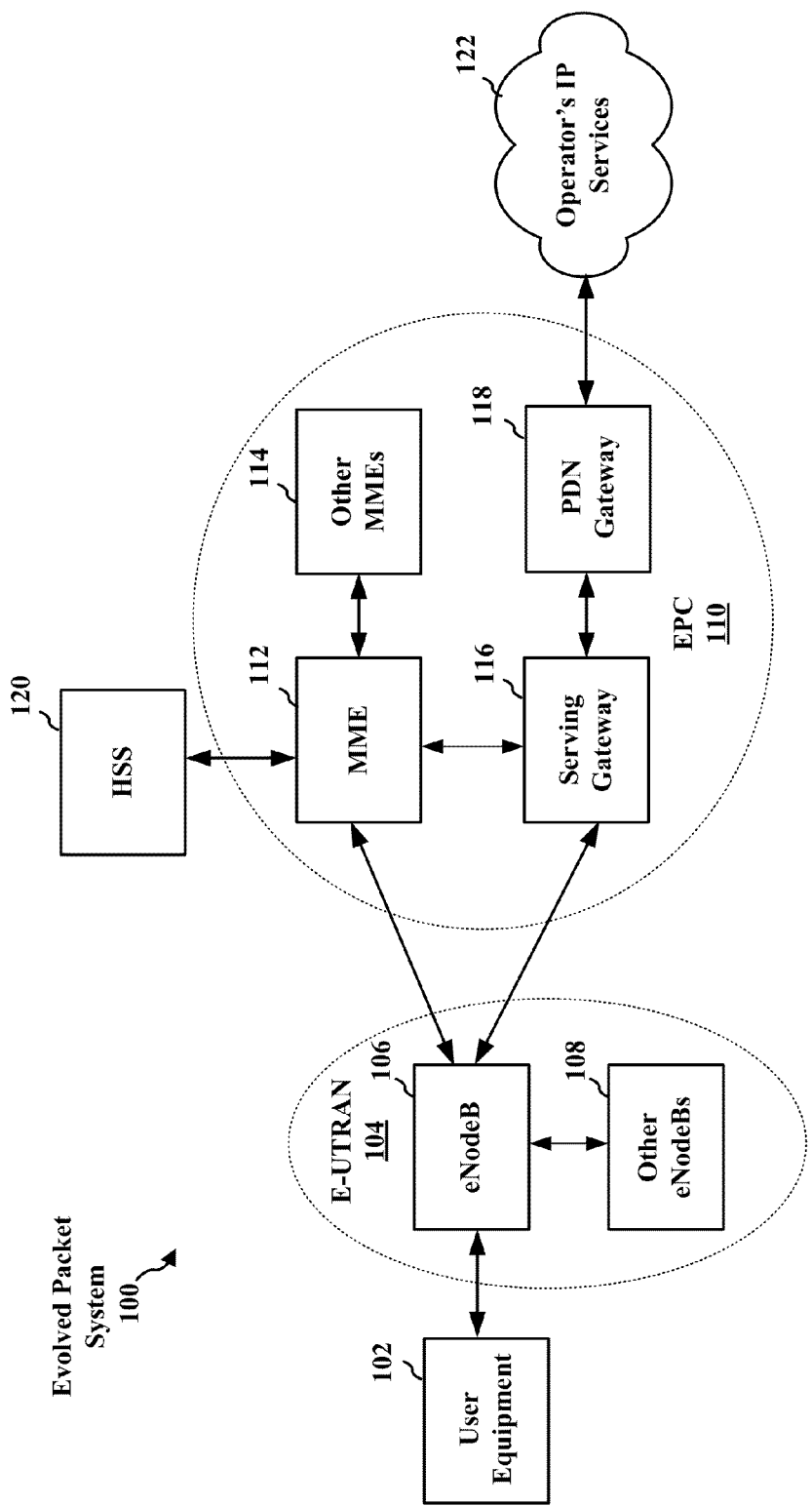
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods.

These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
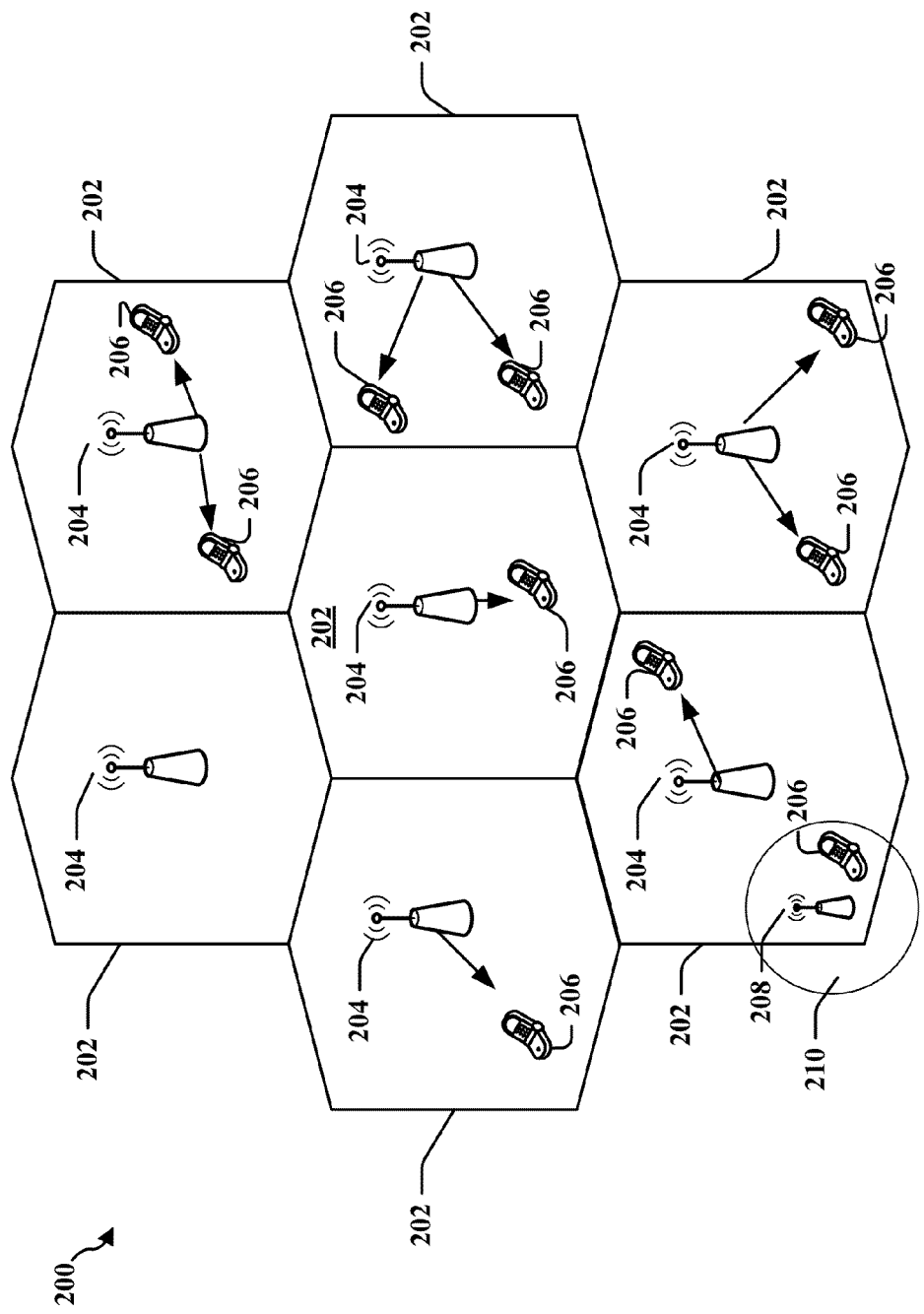
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
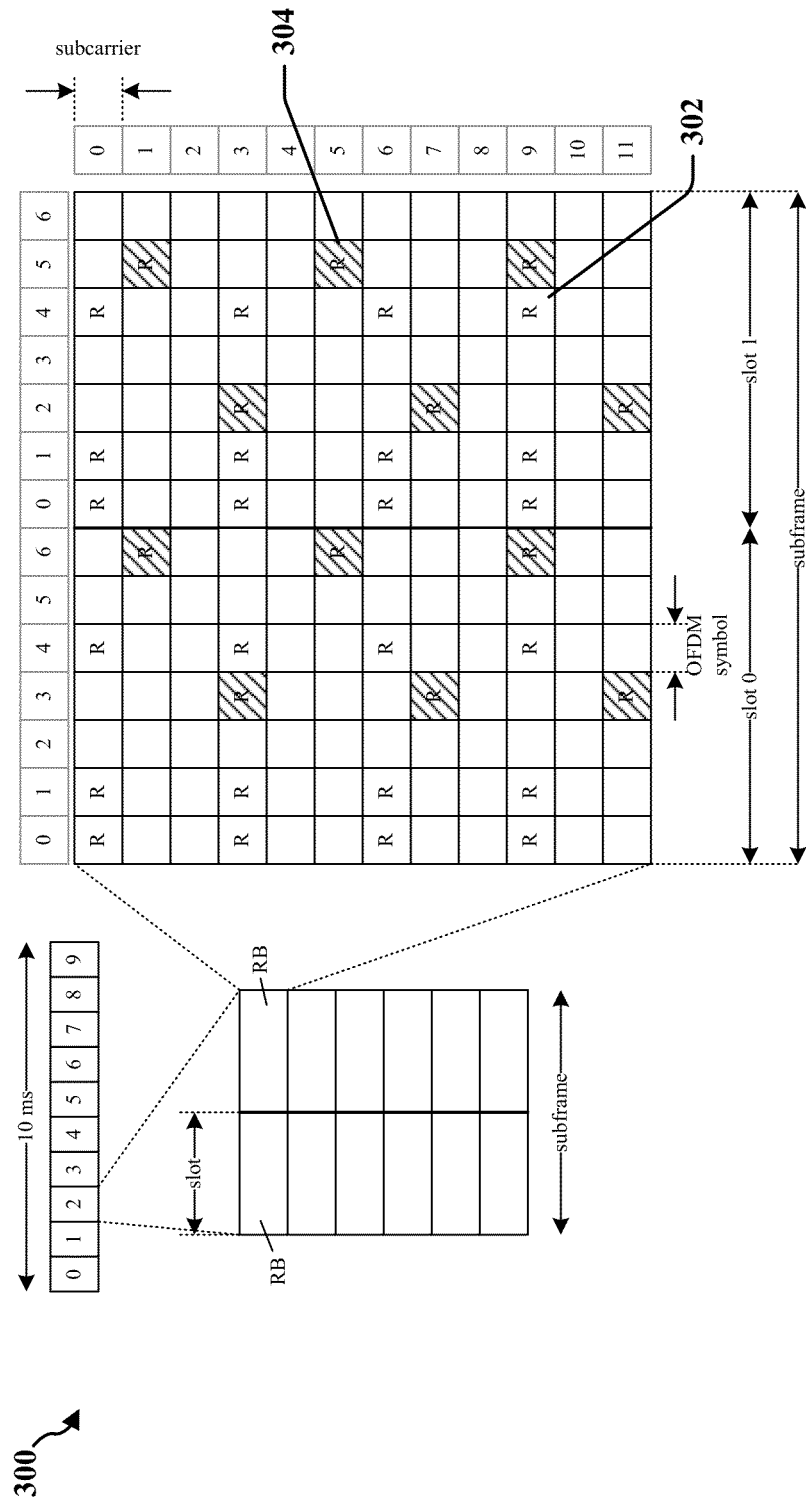
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
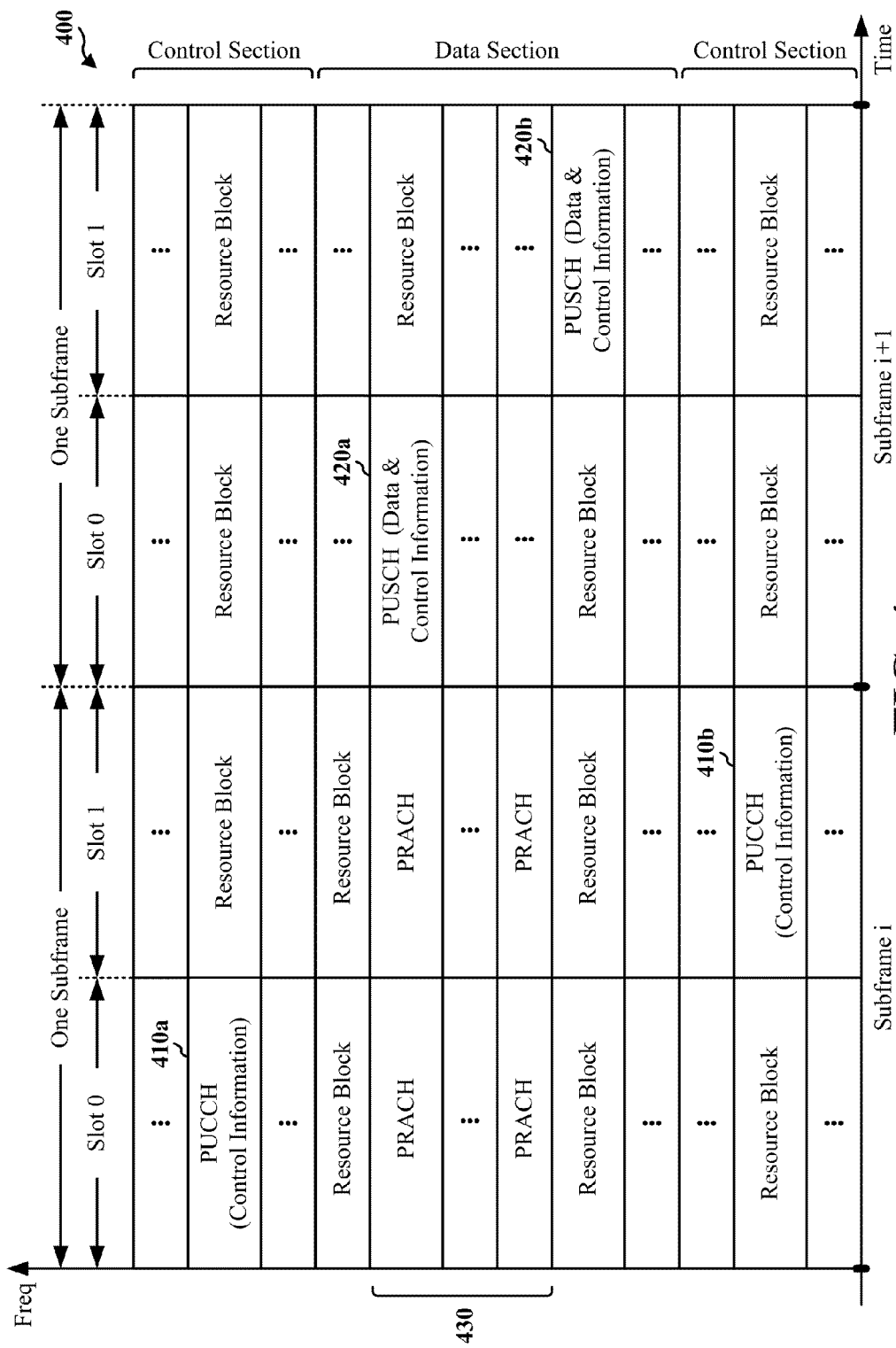
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
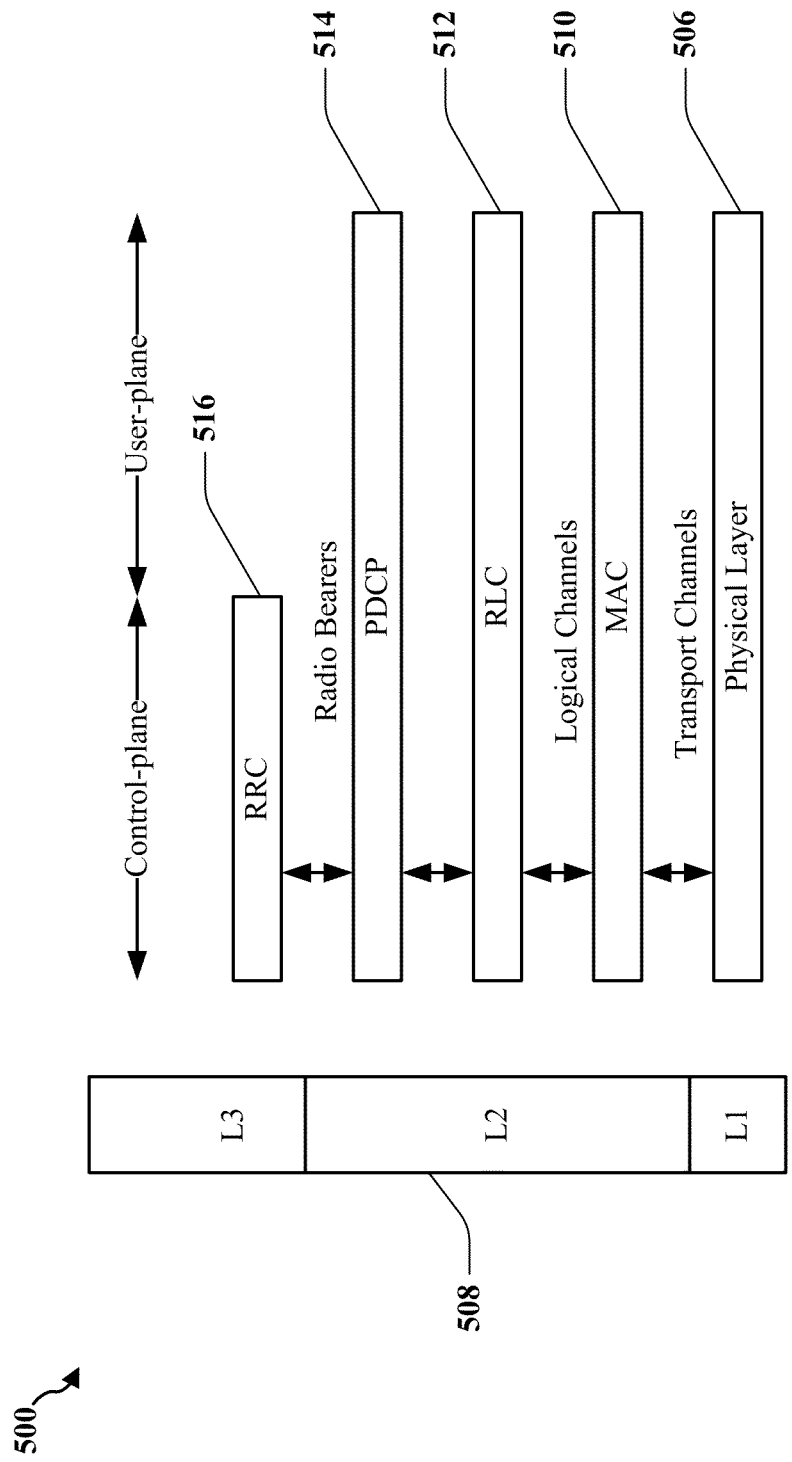
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
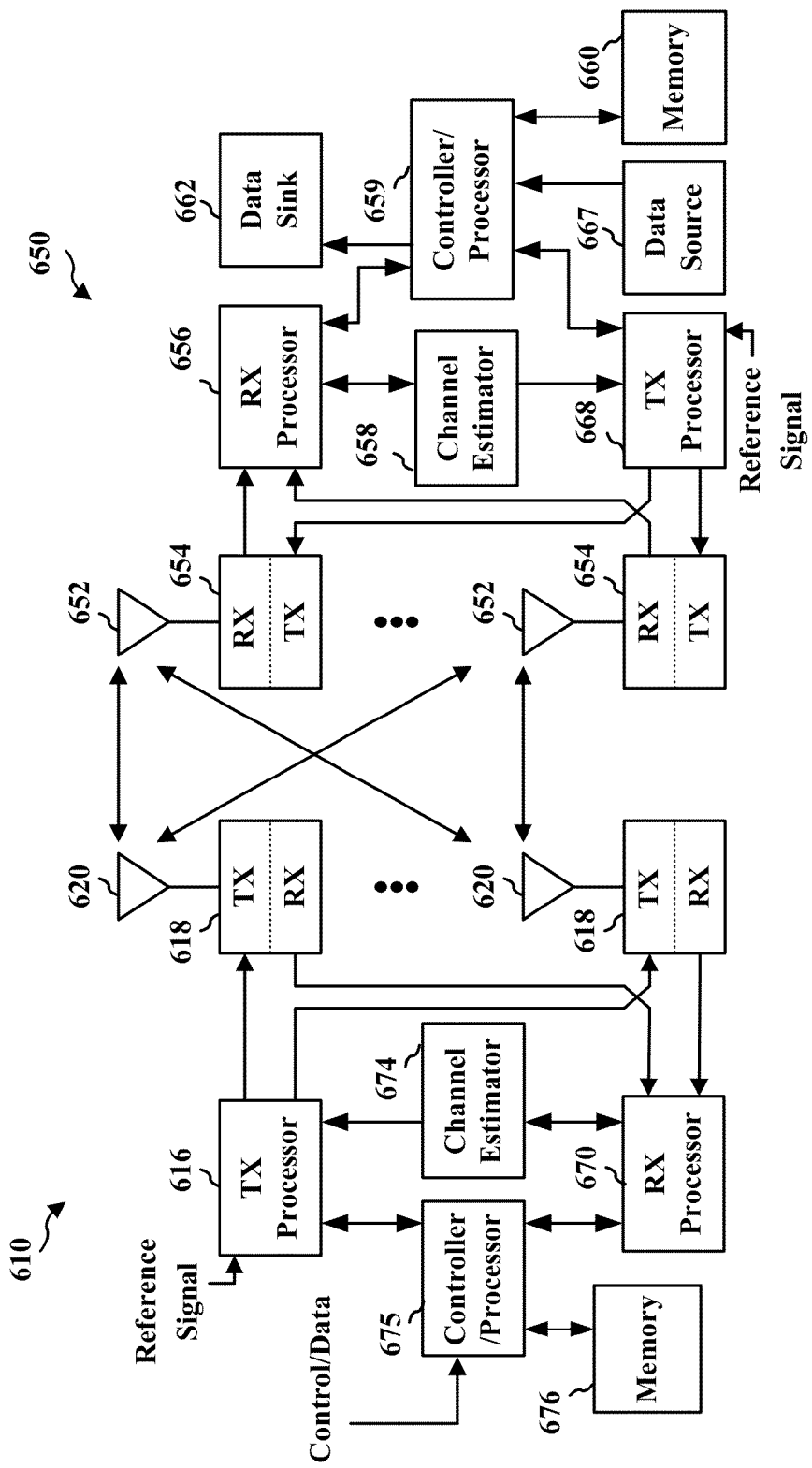
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
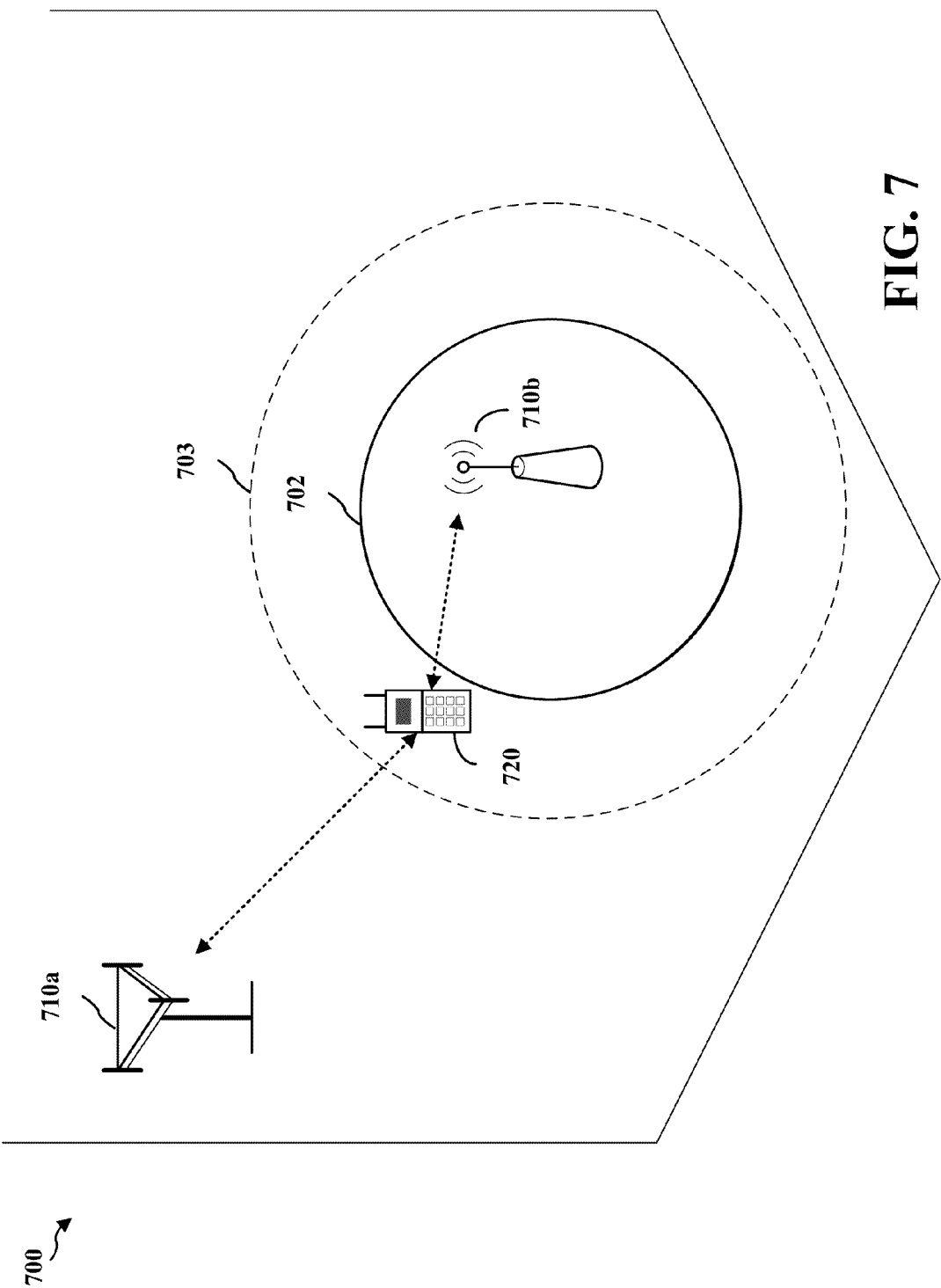
FIG. 7 is a diagram illustrating a range expanded cellular region in a heterogeneous network.

FIG. 7 is a diagram 700 illustrating a range expanded cellular region in a heterogeneous network. A lower power class eNB such as the pico eNB 710b may have a range expanded cellular region 703 that is expanded from the cellular region 702 through eICIC between the pico eNB 710b and the macro eNB 710a and through interference cancellation performed by the UE 720. In one aspect, the UE 720 may move from the pico eNB 710b to the macro eNB 710a via an HO procedure.

Time domain eICIC involves the application of scheduling restrictions on certain subframes of a macro cell to allow a small cell to serve users that are outside the nominal coverage area of the small cell. For example, the macro cell designates certain subframes as Almost Blank Subframes (ABSs) and does not schedule packets on such ABS subframes.

There may be two types of ABS subframes: 'N' subframes and 'AN' subframes. 'N' subframes always remain as ABS subframes, whereas 'AN' subframes are set as ABS subframes, but may be changed to non-ABS subframes depending on the loading scenario using an Adaptive Resource Partitioning (ARP) algorithm.

Subframes that are not ABS subframes may be referred to as non-ABS subframes. There may be two types of non-ABS subframes: 'AC' subframes and subframes. 'AC' subframes are 'AN' subframes that have been changed to non-ABS subframes due to ARP, whereas 'U' subframes are subframes that are never allowed to be set as ABS subframes. In other words, a 'U' subframe is always a non-ABS subframe.

These scheduling restrictions at the macro cell may conflict with the scheduling needs of a UE configured for certain services, such as voice over LTE (VoLTE), which typically require a specific scheduling pattern. For example, wireless communication features that are used when providing a VoLTE service, such as discontinuous reception (DRX), semi-persistent scheduling (SPS) and transmission time interval (TTI) bundling, require a particular scheduling pattern. Therefore, in order to properly provide such wireless communication features to a UE, the particular scheduling pattern should be aligned with subframes (e.g., non-ABS subframes) on which scheduling is permitted in an eICIC configuration.

To properly provide a VoLTE service to a UE, a macro eNB may be configured to adjust an ABS configuration that is used for designating ABS subframes. The ABS configuration may be adjusted by imposing one or more restrictions, such as alignment of the DRX OnDuration of a UE with some offset to the serving cell non-ABS subframes, and imposing restrictions on the ABS subframe settings at the macro eNB. For example, the DRX OnDuration of a UE may be aligned with the 'U' subframes from the macro eNB. As another example, restrictions on the ABS subframe settings at the macro eNB may include restrictions on the number and location of 'N' and 'AN' types of ABS subframes from the macro eNB.

Alignment of the DRX OnDuration of a UE with non-ABS subframes from the macro eNB will now be discussed. In one aspect, an ABS subframe configuration may be represented by a 40-bit bitmap, where each bit of the 40-bit bitmap corresponds to a subframe in a sequence of 40 subframes. For example, a '0' in the bitmap may indicate that a corresponding subframe is an ABS subframe and is not available for scheduling, and a '1' in the bitmap may indicate that a corresponding subframe is a non-ABS subframe (e.g., a subframe unavailable for eICIC) and is available for scheduling. In another aspect, an ABS subframe configuration may be represented by an 8-bit bitmap, where each bit of the 8-bit bitmap corresponds to a subframe in a sequence of eight subframes. For example, the 8-bit bitmap may be repeated five times to generate a 40-bit bitmap. Although the use of the 8-bit bitmap may provide lower complexity than the 40-bit bitmap, it should be noted that the 8-bit bitmap may be more restrictive for eICIC. Moreover, the 40-bit bitmap may provide greater flexibility than the 8-bit bitmap, but requires HARQ suspension or limitation of a maximum number of transmissions in the UL. The 40-bit and 8-bit bitmaps are also referred to as ABS configuration patterns.

Preferably, the DRX feature for a voice service is configured to include a DRX period of approximately 20.0 milliseconds (ms) or 40.0 ms with an OnDuration of approximately 2.0 ms. When the DRX period is approximately 20 ms, alignment may be achieved using an 8-bit ABS configuration pattern where four of the eight bits are set as non-ABS subframes. For example, the 8-bit bitmap may be indicated as '1100 1100'. Alternatively, the 8-bit bitmap may be modified by shifting the eight bits, such that the 8-bit bitmap is indicated as '0110 0110'. The 8-bit bitmap (e.g., '1100 1100') may be repeated five times to generate a 40-bit bitmap. Therefore, such 40-bit bitmap may represent an ABS configuration pattern where the first two subframes in each set of 20 subframes are non-ABS subframes. Accordingly, two consecutive non-ABS subframes may be provided every 20.0 ms to establish alignment with the DRX feature having a DRX period of approximately 20.0 ms and an OnDuration of 2.0 ms.

When the DRX period is approximately 40.0 ms, alignment may be achieved using an 8-bit ABS configuration pattern where two of the eight bits are set as non-ABS subframes. For example, the 8-bit bitmap may be indicated as '1100 0000'. Alternatively, the 8-bit bitmap may be modified by shifting the eight bits, such that the 8-bit bitmap is indicated as '0011 0000'. The 8-bit bitmap (e.g., '1100 0000') may be repeated five times to generate a 40-bit bitmap. Therefore, such 40-bit bitmap may represent an ABS configuration pattern where the first two subframes in each set of 40 subframes are non-ABS subframes. Accordingly, two consecutive non-ABS subframes may be provided every 40.0 ms to establish alignment with the DRX feature having a DRX period of approximately 40.0 ms and an OnDuration of 2.0 ms.

It should be noted that when alignment of the DRX OnDuration of a UE with non-ABS subframes from the macro eNB is achieved using an 8-bit ABS configuration pattern, alignment for SPS is also achieved.

TTI bundling is a feature of LTE where four contiguous uplink subframes carry one MAC packet. Therefore, TTI bundling may improve the link budget for a UE and may be useful with respect to VoLTE services in case there is a link budget limitation. Both TTI bundling and eICIC with ABS impose some form of time domain restriction on the UE/eNB. TTI bundling for a VoLTE service may be configured to work together with an ABS configuration for eICIC.

In one configuration, the scheduling periodicity during a talk spurt may be 20.0 ms. In another configuration, the scheduling periodicity during a talk spurt may be 40.0 ms (bundling of 2 VoIP frames in uplink to a single transport block). It should be noted that TTI bundling may not be needed for pico UEs, since pico UEs are close to pico cell and, therefore, do not have a link budget limitation. In one configuration, there may be a baseline for delay and link budget comparison (e.g., no TTI bundling, max 5 HARQ transmissions).

Figure 8:
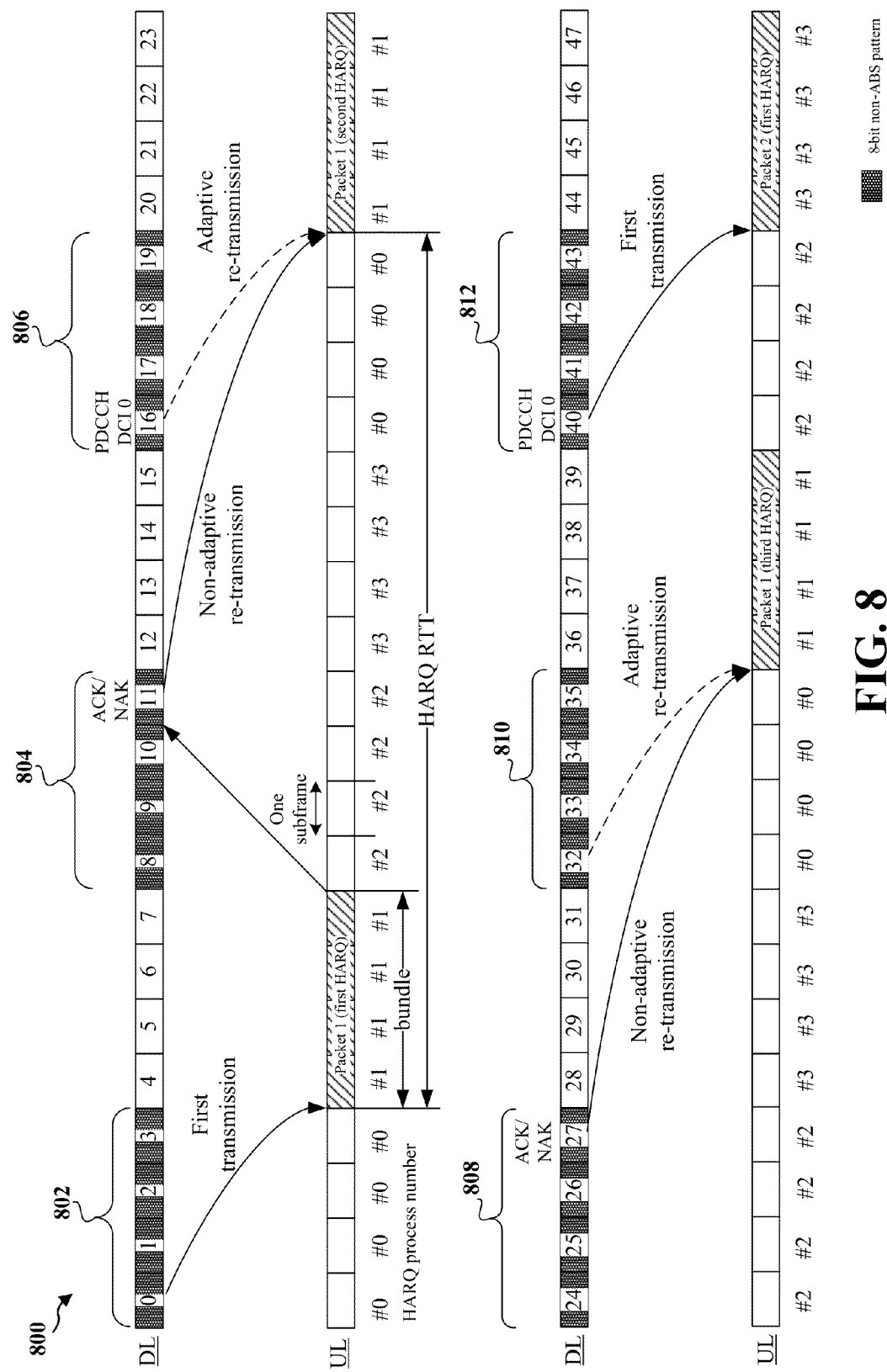
FIG. 8 is a diagram illustrating a subframe scheduling timeline.

FIG. 8 is a diagram 800 illustrating a subframe scheduling timeline. In FIG. 8, the subframe scheduling timeline is configured to support eICIC and TTI bundling. In order for the subframe scheduling timeline to meet the constraints of time domain eICIC, four contiguous subframes must be allocated as non-ABS, such as subframes 802, 804, 806, 808, 810, and 812 indicated in FIG. 8. Accordingly, the 8-bit bitmap representing the ABS subframe configuration pattern in FIG. 8 may be indicated as '1111 0000' (i.e., four consecutive non-ABS subframes followed by four consecutive ABS subframes). In the configuration of FIG. 8, it should be noted that there is an offset between the usable subframes on the UL and the DL, such that if a subframe 'n' is usable on the downlink, then subframe 'n+4' is usable on the uplink. In other configurations, the 8-bit bitmap may be shifted and indicated as '0011 1100', for example.

Figure 9:
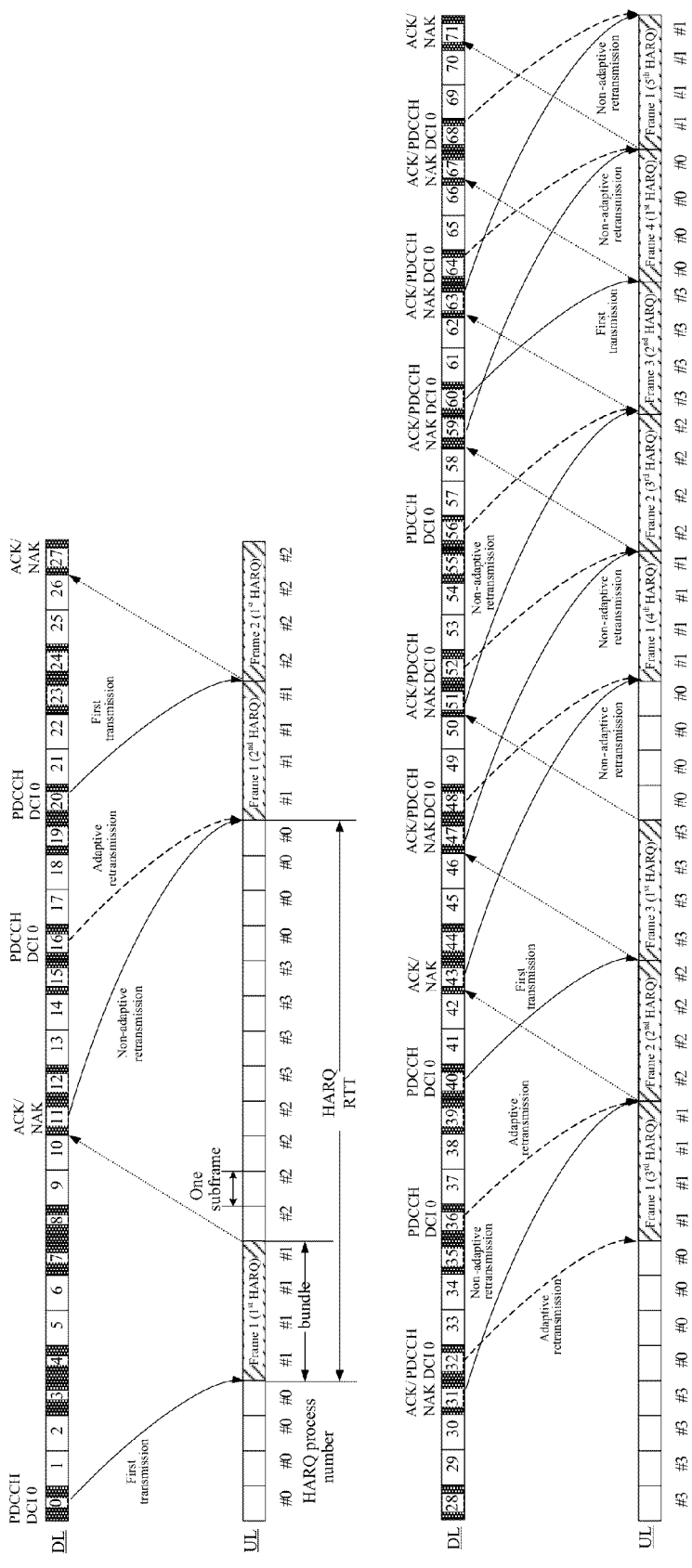
FIG. 9 is a diagram illustrating a subframe scheduling timeline.

FIG. 9 is a diagram 900 illustrating a subframe scheduling timeline. In FIG. 9, the subframe scheduling timeline is configured to support eICIC and TTI bundling. The ABS configuration pattern implemented in FIG. 9 may be represented by an 8-bit bitmap, such as '1001 1001'. Therefore, the minimum non-ABS subframes (e.g., subframes unavailable for eICIC) in subframes 0 through 7 are 0, 3, 4, and 7 (i.e., 4/8=50%). It should be understood that the ABS configuration pattern in FIG. 9 may also be represented by a 40-bit pattern with HARQ suspension. For example, the approximate link gain may be 6.0 dB and the maximum delay may be 72 ms as compared to a configuration where no TTI bundling is used. The actual link gain may be determined via a link simulation. In the configuration of FIG. 9, there are a maximum of five HARQ (re)transmissions for the TTI bundle.

Figure 10:
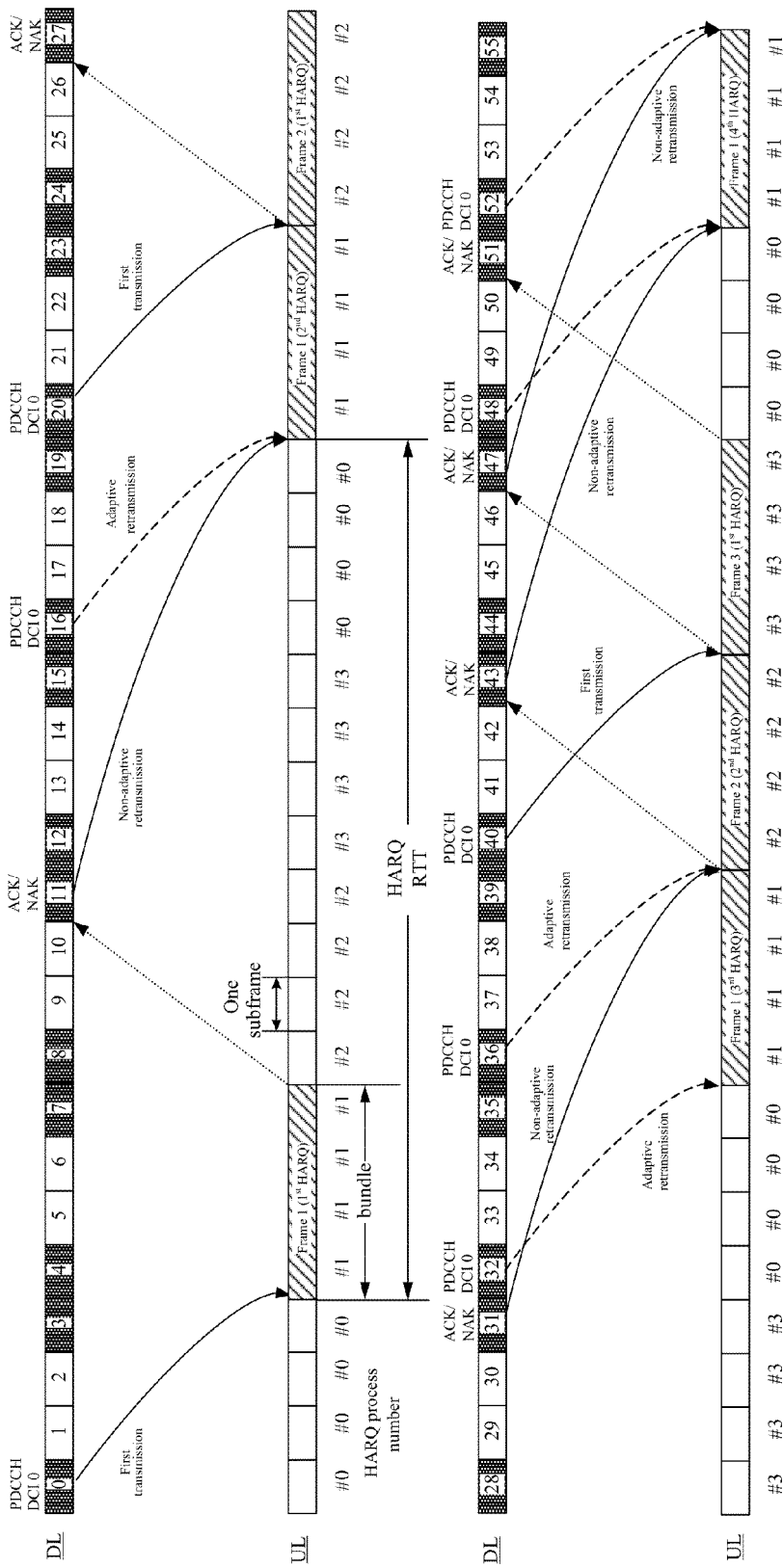
FIG. 10 is a diagram illustrating a subframe scheduling timeline.

FIG. 10 is a diagram 1000 illustrating a subframe scheduling timeline. In FIG. 10, the subframe scheduling timeline is configured to support eICIC and TTI bundling. The ABS configuration pattern implemented in FIG. 10 may be represented by an 8-bit bitmap, such as '1001 1001'. Therefore, the minimum non-ABS subframes (e.g., subframes unavailable for eICIC) in subframes 0 through 7 are 0, 3, 4, and 7 (i.e., 4/8=50%). It should be understood that the ABS configuration pattern in FIG. 10 may also be represented by a 40-bit pattern with HARQ suspension. For example, the approximate link gain may be 5.0 dB and the maximum delay may be 56 ms as compared to a configuration where no TTI bundling is used. The actual link gain may be determined via a link simulation. In the configuration of FIG. 10, there are a maximum of four HARQ (re)transmissions for the TTI bundle.

Figure 11:
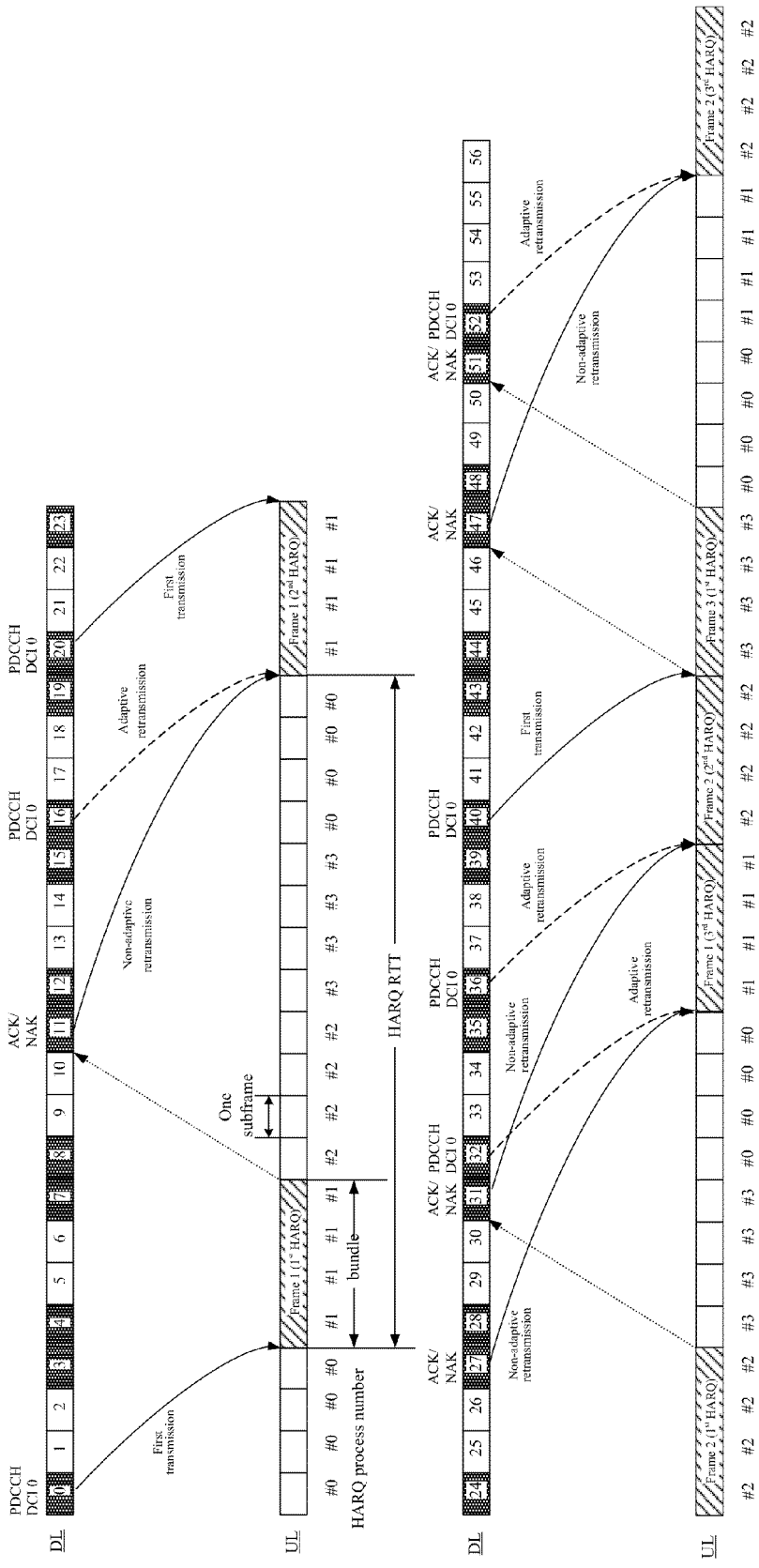
FIG. 11 is a diagram illustrating a subframe scheduling timeline.

FIG. 11 is a diagram 1100 illustrating a subframe scheduling timeline. In FIG. 11, the subframe scheduling timeline is configured to support eICIC and TTI bundling. The ABS configuration pattern implemented in FIG. 11 may be represented by an 8-bit bitmap, such as '1001 1001'. Therefore, the minimum non-ABS subframes (e.g., subframes unavailable for pico cell range expansion (CRE)) in subframes 0 through 7 are 0, 3, 4, and 7 (i.e., 4/8=50%). It should be understood that the ABS configuration pattern in FIG. 11 may also be represented by a 40-bit pattern with HARQ suspension. For example, the approximate link gain may be 3.8 dB and the maximum delay may be 40 ms as compared to a configuration where no TTI bundling is used. The actual link gain may be determined via a link simulation. In the configuration of FIG. 10, there are a maximum of three HARQ (re)transmissions for the TTI bundle. Table 1 below summarizes the multiple options that may be available for configuring ABS subframes to work coherently with TTI bundling and VoLTE.

configuration of FIG. 11. Therefore, the simplest option is an ABS configuration pattern represented by an 8-bit bitmap with minimum non-ABS subframes (e.g., a set of subframes {0, 3, 4, 7} in subframes 0 through 7) (or any cyclic shift of this set) when VoLTE with TTL bundling is enabled. An ABS configuration pattern represented by a 40-bit bitmap is also possible with more ABS granularity and flexibility.

Figure 12:
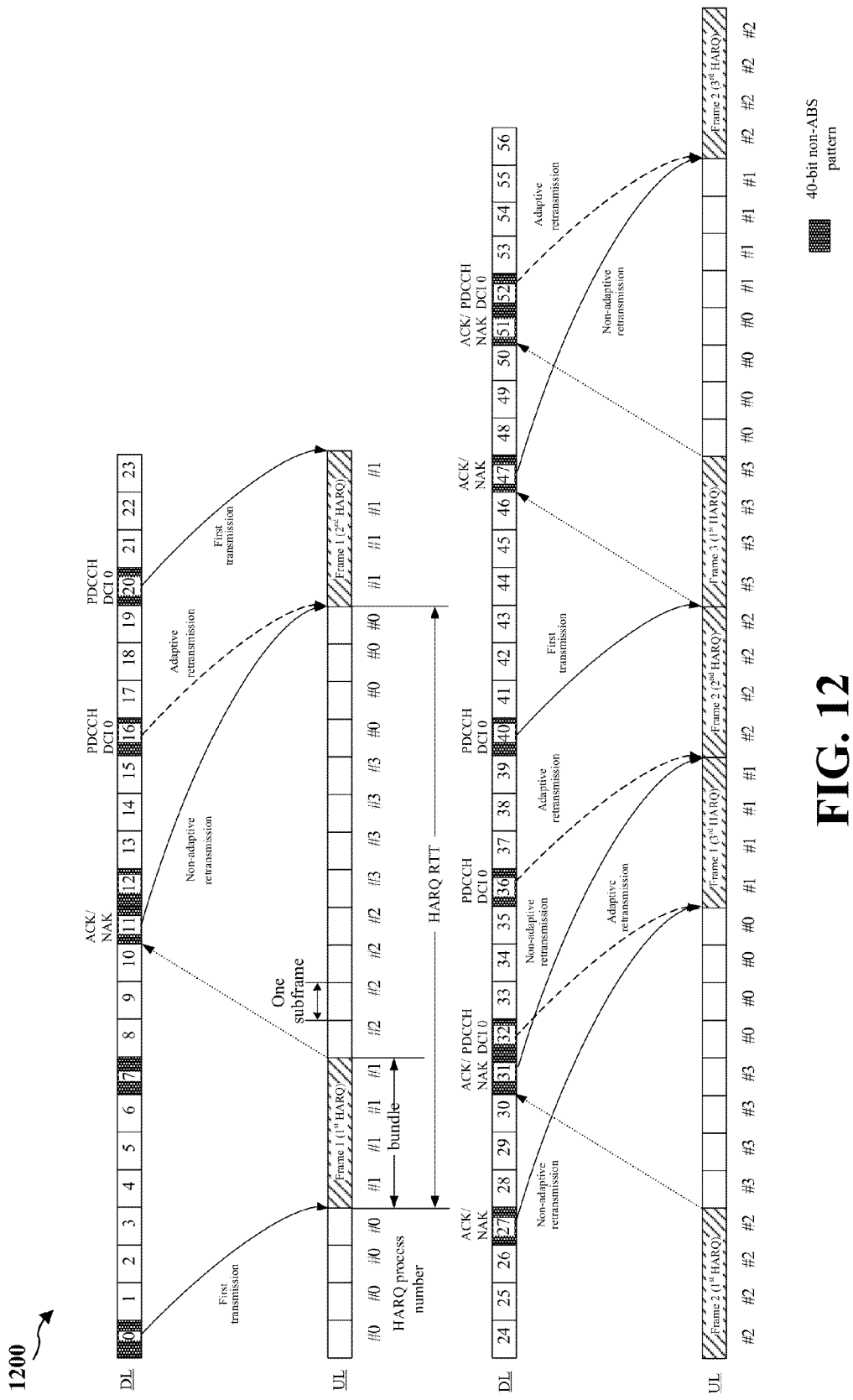
FIG. 12 is a diagram illustrating a subframe scheduling timeline.

FIG. 12 is a diagram 1200 illustrating a subframe scheduling timeline. In FIG. 12, the subframe scheduling timeline is configured to support eICIC and TTI bundling. The ABS configuration pattern implemented in FIG. 12 may be represented by a 40-bit bitmap, such as '1000 0001 0001 1000 1000 1000 0001 0001 1000 1000'. Therefore, the minimum non-ABS subframes (e.g., subframes unavailable for pico CRE) in subframes 0 through 39 are 0, 7, 11, 12, 16, 20, 27, 31, 32, and 36, (i.e., 10/40=25%). For example, the approximate link gain may be 3.8 dB and the maximum delay may be 40 ms as compared to a configuration where no TTI bundling is used. The actual link gain may be determined via more accurate modeling. In the configuration of FIG. 12, there are a maximum of three HARQ (re)transmissions for the TTI bundle.

Figure 13:
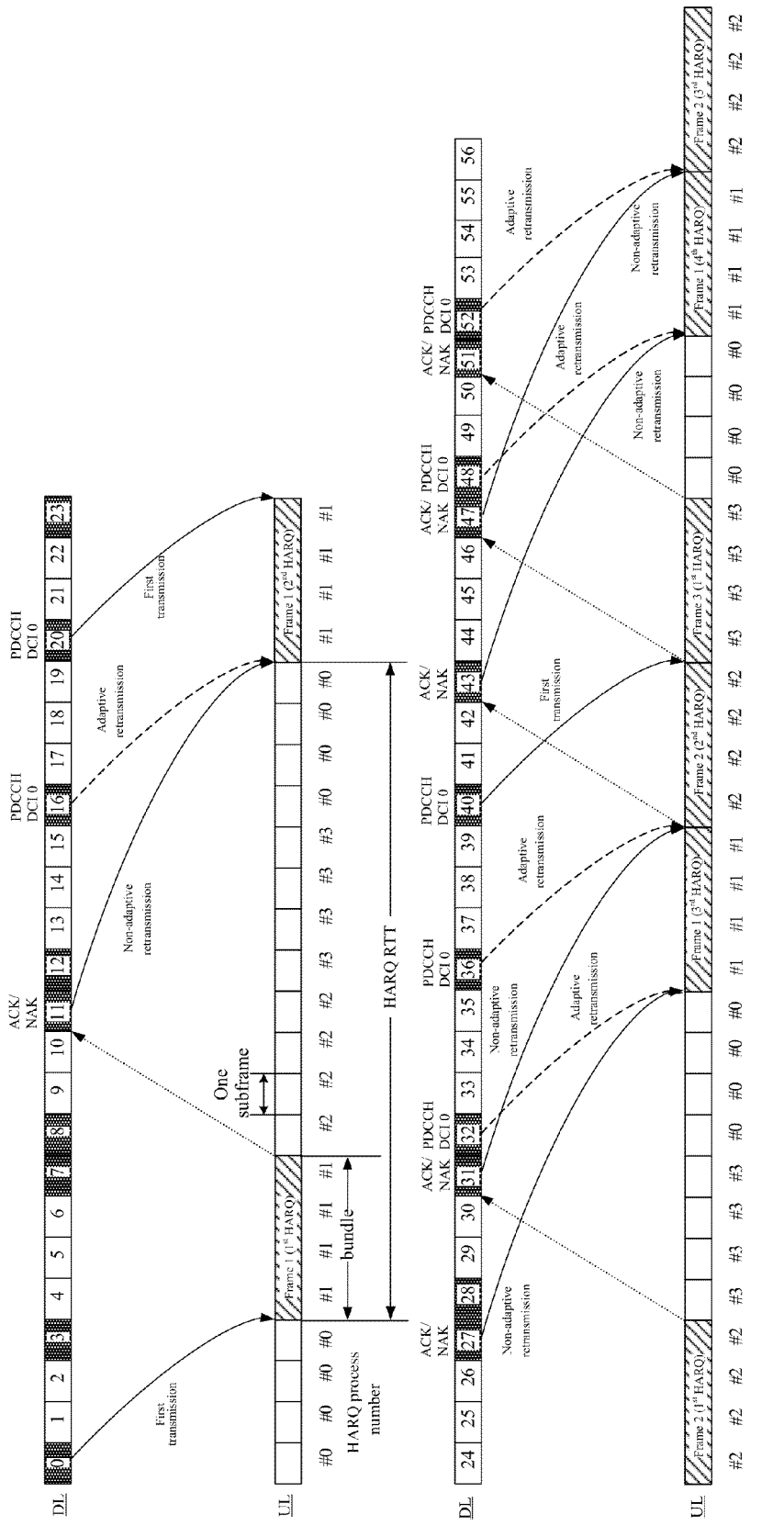
FIG. 13 is a diagram illustrating a subframe scheduling timeline.

FIG. 13 is a diagram 1300 illustrating a subframe scheduling timeline. In FIG. 13, the subframe scheduling timeline is configured to support eICIC and TTI bundling. The ABS configuration pattern implemented in FIG. 13 may be represented by a 40-bit bitmap, such as '1001 0001 1001 1000 1000 1001 0001 1001 1000 1000'. Therefore, the minimum non-ABS subframes (e.g., subframes unavailable for eICIC) in subframes 0 through 39 are 0, 3, 7, 8, 11, 12, 16, 20, 23, 27, 28, 31, 32, and 36 (i.e., 14/40=35%). For example, the approximate link gain may be 5.0 dB and the maximum delay may be 56 ms as compared to a configuration where no TTI bundling is used. The actual link gain may be determined via more accurate modeling. In the configuration of FIG. 13, there are a maximum of four HARQ (re)transmissions for the TTI bundle.

Figure 14:
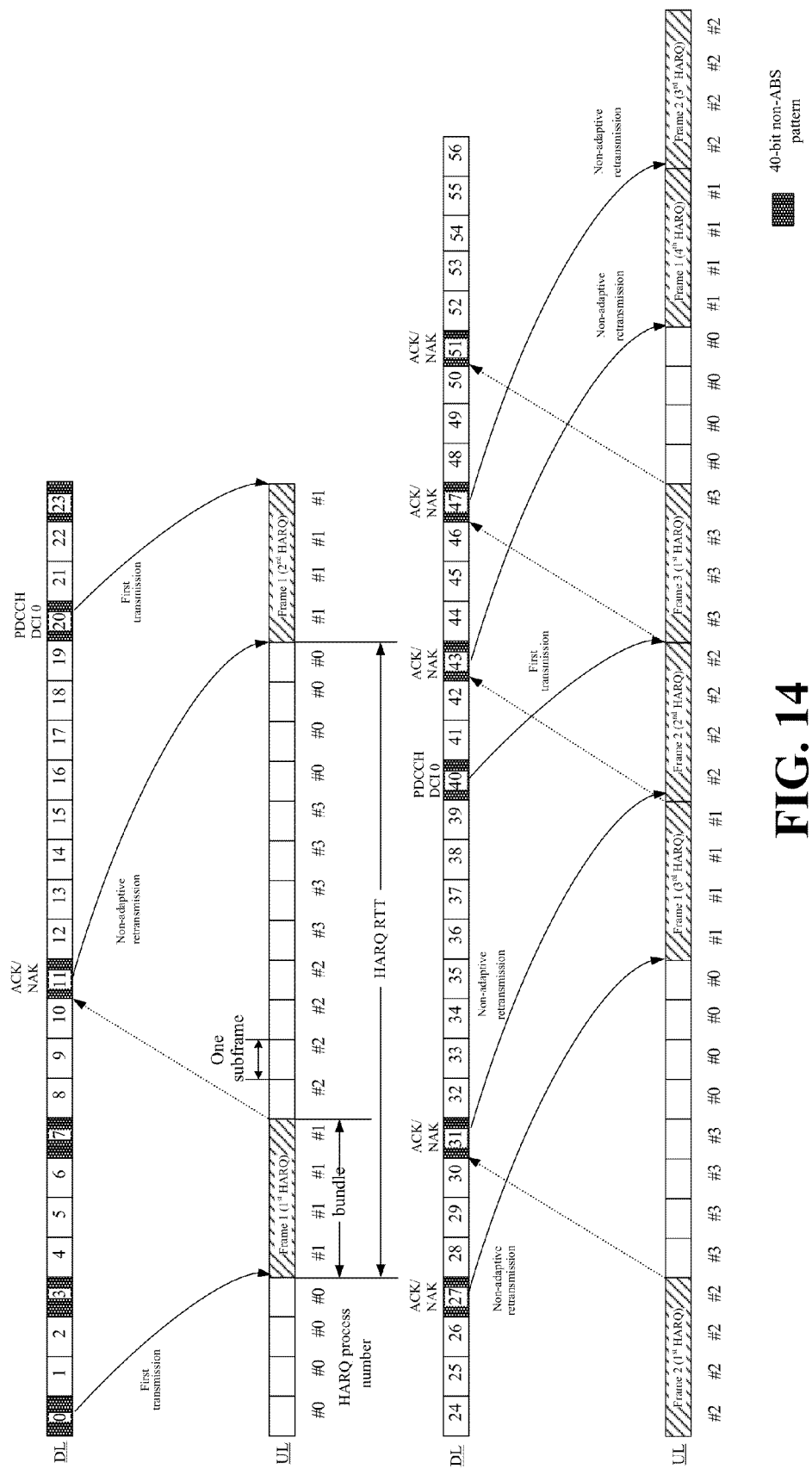
FIG. 14 is a diagram illustrating a subframe scheduling timeline.

FIG. 14 is a diagram 1400 illustrating a subframe scheduling timeline. In FIG. 14, the subframe scheduling timeline is configured to support eICIC and TTI bundling. The ABS configuration pattern implemented in FIG. 14 may be represented by a 40-bit bitmap, such as '1001 0001 0001 0000 0000 1001 0001 0001 0000 0000'. Therefore, the minimum non-ABS subframes (e.g., subframes unavailable for eICIC) in subframes 0 through 39 are 0, 3, 7, 11, 20, 23, 27, and 31 (i.e., 8/40=20%). For example, the approximate link gain may be 5.0 dB and the maximum delay may be 56 ms as compared to a configuration where no TTI bundling is used. The actual link gain may be determined via more accurate modeling. In the configuration of FIG. 14, there are a maximum of four HARQ (re)transmissions for the TTI bundle and no adaptive

TABLE 1

| Scenario | | Max # of Tx Subframes | VoIP Frame bundling | Max. ABS, 8-bit pattern (%) | Max HARQ Delay | Link gain (dB) |
|---|---|---|---|---|---|---|
| No TTI bundling | | 5 | No | 75% | 37 ms | — |
| TTI bundling | Option 1 | 20 | No | 50% | 72 ms | 6.0 dB |
| | Option 2 | 16 | No | 50% | 56 ms | 5.0 dB |
| | Option 3 | 12 | No | 50% | 40 ms | 3.8 dB |

In Table 1, for example, "Option 1" corresponds to the configuration of FIG. 9, "Option 2" corresponds to the configuration of FIG. 10, and "Option 3" corresponds to the TTI bundle transmissions. Therefore, the configuration of FIG. 14 does not include adaptive retransmissions of TTI bundles.

It should be understood that the 8-bit bitmaps and the 40-bit bitmaps discussed above with respect to FIGS. 8 through 14 may be shifted by an offset (e.g., one or more bits) in other configurations.

In one aspect, in order to meet the constraints on ABS subframes imposed by a wireless communication feature related to a VoLTE service, a maximum limit (i.e., a cap) may be set on the number of subframes that may be allocated as ABS. Alternatively, a minimum limit may be set on the number of subframes that may be allocated as non-ABS. In one configuration, the maximum limit may be set by configuring a certain number of subframes as 'U' subframes. For example, when the DRX feature is initiated with a DRX period of approximately 20.0 ms, two of every eight consecutive subframes may be allocated as 'U' subframes and, therefore, a maximum of six subframes of every eight consecutive subframes may be ABS subframes. As another example, when the TTI bundling feature is initiated, four of every eight consecutive subframes may be allocated as 'U' subframes and, therefore, a maximum of four of every eight consecutive subframes may be ABS subframes. Therefore, such an aspect provides a low complexity approach for meeting the constraints on ABS subframes imposed by wireless communication features and also allows for testing the coexistence of UEs configured to receive VoLTE services and UEs configured for eICIC services within the same network.

In another aspect, restrictions on ABS subframe allocation by a macro eNB may be a function of the features being used by UEs in the macro cell, as indicated in Table 2 below.

TABLE 2

| Number of DRX UEs in macro cell | Number of TTI Bundling UEs in macro cell | Required non-ABS subframes |
| --- | --- | --- |
| 0 | 0 | ≥1 |
| ≥1 | 0 | ≥2 |
| 0 | ≥1 | ≥4 |

As shown in Table 2, if there are no UEs in the macro cell using the DRX feature or the TTI bundling feature, then one or more non-ABS subframes are required. If there is at least one UE in the macro cell using the DRX feature and there are no UEs using the TTI bundling feature, then two or more non-ABS subframes are required. If there are no UEs in the macro cell using the DRX feature and there is at least one UE using the TTI bundling feature, then four or more non-ABS subframes are required.

When implementing restrictions on the number ABS subframes that may be allocated by a macro eNB, the number of 'U' subframes are preferably set to the lowest value (e.g., one 'U' subframe), and the number of 'AC' subframes are adjusted as needed. When a UE needing a wireless communication feature (e.g., DRX and/or TTI bundling) related to a VoLTE service joins a macro cell, the number of 'U/AC' subframes may be adjusted to accommodate the wireless communication feature. A UE may join the macro cell in various ways. For example, a UE receiving a VoLTE service may join the macro cell via an HO from another cell. In one configuration, the UE may join the macro cell via an HO while operating under a policy that requires the UE to use the TTI bundling feature regardless of channel conditions. As another example, a UE configured for a VoLTE service may join the macro cell by establishing a VoLTE call in a macro cell. In one configuration, the UE may join the macro cell by establishing a VoLTE call while operating under a policy that requires the UE to use the TTI bundling feature regardless of channel conditions. As another example, a UE configured for a VoLTE service and that is already in the macro cell may join a macro cell by enabling TTI bundling, where the TTI bundling is enabled based on channel conditions of the UE.

As discussed infra, once a UE configured for a wireless communication feature related to a VoLTE service joins a macro cell, a HetNet Resource Request procedure may be initiated by the macro cell to reclaim more 'AC' subframes. In one configuration, such procedure may be initiated by sending a HetNet Resource Request message, e.g., such as a "LOAD INFORMATION" message in the X2 protocol.

The HetNet Resource Request message may be transmitted by the macro eNB to one or more pico eNBs according to different timing configurations with respect to the periodic messaging scheme between the macro eNB and the one or more pico eNBs.

In one aspect, a macro eNB may transmit the HetNet Resource Request message according to a synchronized adjustment configuration. In such a configuration, the macro eNB waits for the next ABS adjustment cycle before transmitting the HetNet Resource Request message to a pico eNB regarding the change in the ABS configuration of the macro eNB. For example, the ABS adjustment cycle may have a duration of approximately 100.0 ms. It should be noted that the change to subframe partitioning is slower when the synchronized adjustment configuration is implemented, which may result in a delay in enabling a wireless communication feature (e.g., a VoLTE feature) of interest.

In another aspect, the HetNet Resource Request message may be transmitted according to an asynchronous adjustment configuration. In such a configuration, the macro eNB does not wait for the next ABS adjustment cycle. For example, the macro eNB may immediately transmit the HetNet Resource Request message to the pico eNB regarding the change in the ABS configuration of the macro eNB. In a case where the HO of the UE to the macro eNB is completed before the subframes become available, scheduling for the UE will become constrained (or made impossible in case of TTI bundling) until the subframes become available. The synchronized adjustment configuration and the asynchronous adjustment configuration may also be applied for establishing a VoLTE call and for enabling TTI bundling.

After the macro eNB transmits the HetNet Resource Request message and while the ABS configuration pattern implemented by the macro eNB is pending adjustment, a UE configured for VoLTE services may be handled by suspending an HO or call, or by optimistically accepting an HO or call.

When suspending an HO or call, the incoming HO or call setup to the macro eNB is suspended until a pico eNB confirms the change in the ABS subframe configuration. For example, the incoming HO or call setup to the macro eNB may be suspended by delaying X2 Handover Request Acknowledge or RRC Reconfiguration.

When optimistically accepting an HO or call, the incoming HO or call setup to the macro eNB is accepted by the macro eNB while the 'AC' subframes are being negotiated. Preferably, optimistically accepting an HO or call is used with the asynchronous adjustment configuration, as discussed herein with respect to FIG. 15.

Figure 15:
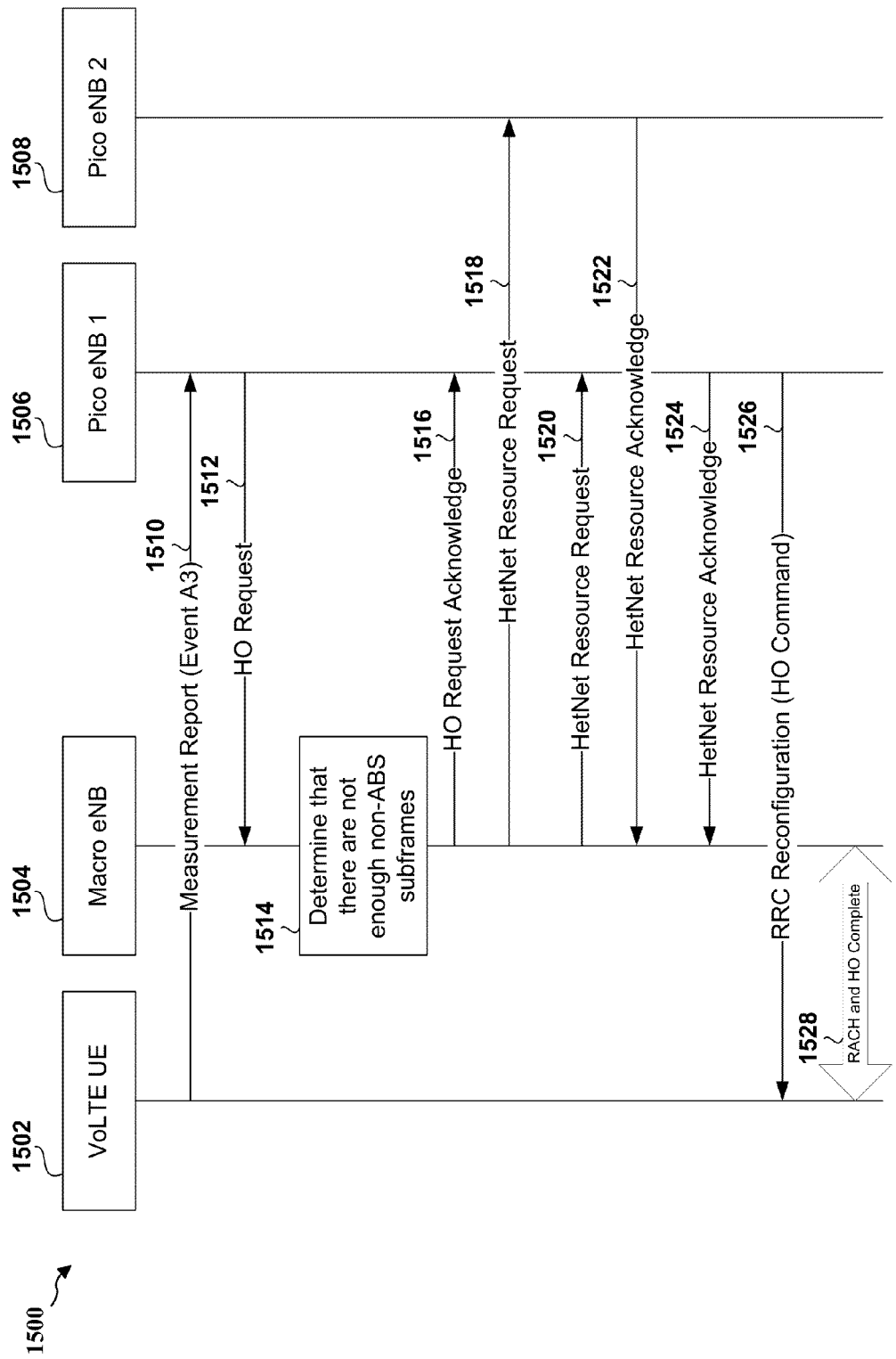
FIG. 15 is a diagram illustrating an adjustment of an ABS configuration of a macro eNB in a HetNet.

FIG. 15 is a diagram 1500 illustrating an adjustment of an ABS configuration of a macro eNB in a HetNet. As shown in FIG. 15, diagram 1500 includes UE 1502 configured to receive a VoLTE service (also referred to as a "VoLTE UE"), macro eNB 1504, pico eNB 1 1506, and pico eNB 2 1508.

As shown in FIG. 15, the VoLTE UE 1502 requesting handover to the macro eNB 1504 transmits measurement report 1510, which is received by the pico eNB 1 1506. The pico eNB 1 1506 transmits a handover (HO) request 1512 to the macro eNB 1504. For example, the HO request 1512 may include a list of UE capabilities and bearer configurations. The macro eNB 1504 may determine which wireless communication features related to VoLTE services are needed using the information included in the HO request 1512.

The macro eNB 1504 may determine that it does not have sufficient 'U' or 'AC' subframes to enable the needed wireless communication features. For example, the macro eNB 1504 may make the determination based on one or more ABS restrictions, such as the ABS restrictions previously discussed with respect to Table 2.

The macro eNB 1504 transmits an HO Request Acknowledge 1516 to the pico eNB 1 1506. This reflects the optimistic case, and is acceptable because the HetNet resource change procedure takes only a few milliseconds, and is almost certain to be completed before the VoLTE UE 1502 completes the HO.

The macro eNB 1504 transmits the HetNet Resource Requests 1518 and 1520 to the pico eNB 2 1508 and the pico eNB 1 1506, respectively. The HetNet Resource Requests 1518 and 1520 indicate to the pico eNB 1 1506 and pico eNB 2 1508 that the macro eNB 1504 is claiming back one or more 'AU' subframes. In one configuration, the HetNet Resource Requests 1518 and 1520 are transmitted concurrently with the HO Request Acknowledge 1516.

The pico eNB 2 1508 replies to the macro eNB 1504 to confirm the reception of the HetNet Resource Request 1518 by transmitting a HetNet Resource Acknowledge 1522. The pico eNB 1 1506 replies to the macro eNB 1504 to confirm the reception of the HetNet Resource Request 1520 by transmitting the HetNet Resource Acknowledge 1524.

The pico eNB 1 1506 then instructs the VoLTE UE 1502 to handover to the macro eNB 1504 by transmitting an HO command, such as RRC Reconfiguration 1526. HO 1528 to the macro eNB 1504 is then completed.

A lower layer configuration for PUCCH will now be described. The use of appropriate 'A' or 'AU' subframes ensures that PDCCH/PDSCH/PUSCH of the VoLTE UE do not cause interference to users in the CRE region of a pico cell. However, an alternative solution for PUCCH may be needed based on the configuration being implemented.

The CQI/SR/SRS opportunity for VoLTE UEs is aligned with the DRX period to save the battery power of the VoLTE UEs. This does not naturally align with the PUSCH subframe. The PUCCH resources for the VoLTE UE should be aligned with DRX cycles and the 'U' or 'AC' subframes for the macro eNB. To protect PUCCH for UEs in the pico cell, it is preferable to prevent a conflict with the VoLTE UEs in the macro cell. Therefore, the PUCCH resources for UEs in the pico cell should use subframes that are different from the subframes used for PUCCH by VoLTE UEs in the macro cell.

Figure 16:
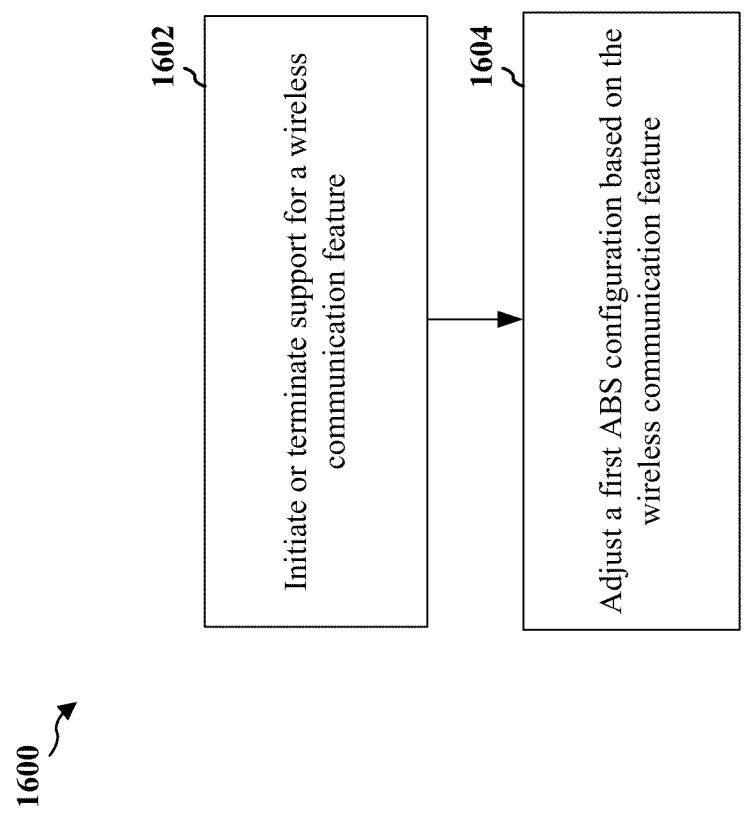
FIG. 16 is a flow chart of a method of wireless communication.

FIG. 16 is a flow chart 1600 of a method of wireless communication. The method may be performed by a macro eNB. At step 1602, the macro eNB initiates or terminates support for a wireless communication feature. In one configuration, the wireless communication feature may be related to a VoLTE service, such as DRX, SPS, and/or TTI bundling. In one aspect, support for the wireless communication feature is initiated or terminated based on a presence or absence of a UE.

At step 1604, the macro eNB adjusts a first ABS configuration based on the wireless communication feature. The macro eNB may adjust the first ABS configuration by setting a maximum limit on a number of ABS subframes or by setting a minimum limit on a number of non-ABS subframes based on the wireless communication feature. In an aspect, the adjustment may be performed by setting ABS locations based on a bitmap. For example, the first ABS configuration may be represented by an 8-bit bitmap. In an aspect, each bit of the 8-bit bitmap corresponds to a subframe in a sequence of eight subframes. In such aspect, a '0' in the bitmap may indicate that a corresponding subframe is an ABS subframe and is not available for scheduling, and a '1' in the bitmap may indicate that a corresponding subframe is a non-ABS subframe (e.g., a subframe unavailable for eICIC) and is available for scheduling. For example, the ABS locations may include at least four consecutive ABS subframes when the wireless communication feature involves DRX. As another example, the ABS locations may relate to a specific pattern when the wireless communication feature involves TTI bundling.

For example, when the wireless communication feature is the DRX feature with a DRX period of approximately 20.0 ms, the macro eNB may adjust the first ABS configuration such that two of every eight consecutive subframes are allocated as 'U' subframes and, therefore, a maximum of six subframes of every eight consecutive subframes are ABS subframes. Accordingly, the 8-bit bitmap may be indicated as '1100 0000'. Alternatively, the 8-bit bitmap may be modified by shifting the eight bits, such that the 8-bit bitmap is indicated as '0011 0000'. In another configuration, the first ABS configuration may be represented by a 40-bit bitmap. For example, the previously discussed 8-bit bitmap (e.g., '1100 0000') may be repeated five times to generate the 40-bit bitmap. Therefore, such 40-bit bitmap may represent an ABS configuration pattern where the first two subframes in each set of 40 subframes are non-ABS subframes.

As another example, and as previously discussed with respect to example configurations of FIGS. 8 through 11, when the wireless communication feature is the TTI bundling feature, the macro eNB may adjust the first ABS configuration such that four of every eight consecutive subframes are allocated as 'U' subframes and, therefore, a maximum of four of every eight consecutive subframes are ABS subframes. In another configuration, the macro eNB may adjust the first ABS configuration by allocating a predetermined number of subframes as non-ABS subframes. For example, the predetermined number may be equal to or greater than the minimum limit on the number of non-ABS subframes. In yet another configuration, the macro eNB may adjust the first ABS configuration based on a minimum number of the UEs using the wireless communication feature, such that a number of subframes are configured as non-ABS subframes as a function of the number of the UEs as previously discussed with respect to Table 2.

Figure 17:
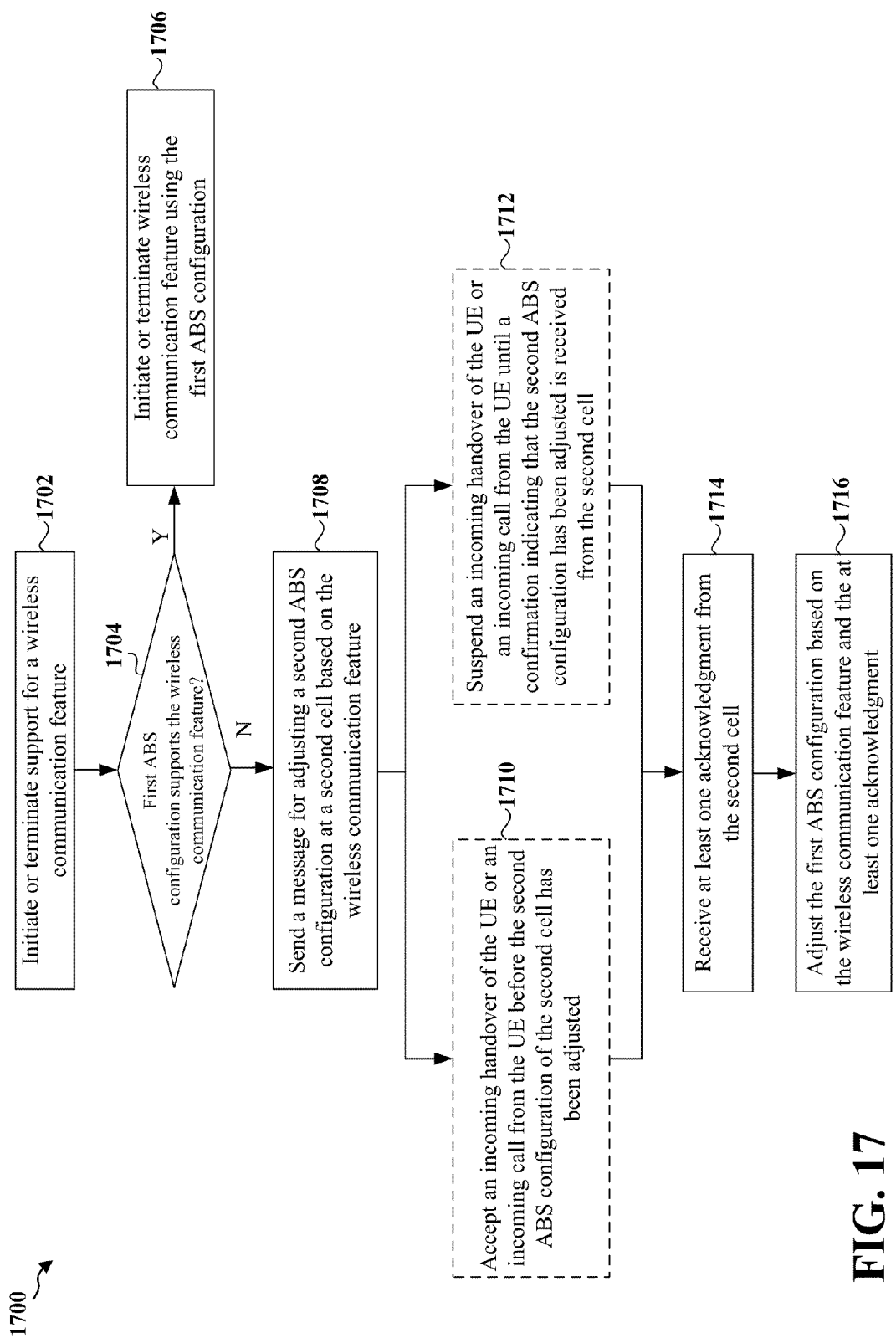
FIG. 17 is a flow chart of a method of wireless communication.

FIG. 17 is a flow chart 1700 of a method of wireless communication. The method may be performed by a macro eNB. At step 1702, the macro eNB initiates or terminates support for a wireless communication feature. In one configuration, the wireless communication feature may be related to a VoLTE service, such as DRX, SPS, and/or TTI bundling. In one aspect, support for the wireless communication feature is initiated or terminated based on a presence or absence of a UE.

At step 1704, the macro eNB determines whether a first ABS configuration supports the initiated wireless communication feature. For example, if the wireless communication feature is TTI bundling and the first ABS configuration does not allocate at least four consecutive non-ABS subframes as needed by the TTI bundling feature, then the macro eNB may determine that the first ABS configuration cannot support the TTI bundling feature. If the first ABS configuration can support the initiated wireless communication feature (1704), then at step 1706 the wireless communication feature is initiated using the first ABS configuration. If the first ABS configuration cannot support the initiated wireless communication feature (1704), then at step 1708, the macro eNB may send a message for adjusting a second ABS configuration at a second cell based on the wireless communication feature. In one configuration, with reference to FIG. 15, the second cell may be a pico eNB (e.g., pico eNB 1 1506) and the message may be a HetNet Resource Request message (e.g., HetNet Resource Request 1520).

In one aspect, the macro eNB may transmit the HetNet Resource Request message according to a synchronized adjustment configuration such that the macro eNB waits for the next ABS adjustment cycle before transmitting the HetNet Resource Request message to a pico eNB regarding the change in the ABS configuration of the macro eNB. In another aspect, the HetNet Resource Request message may be transmitted according to an asynchronous adjustment configuration such that the macro eNB immediately transmits the HetNet Resource Request message without waiting for the next ABS adjustment cycle.

At step 1710, the macro eNB may optimistically accept an incoming HO or call setup to the macro eNB while the 'AC' subframes are being negotiated, that is, before the second ABS configuration of the pico eNB has been adjusted.

Alternatively, at step 1712, the macro eNB may suspend an incoming HO or call setup to the macro eNB until a pico eNB confirms the change in the ABS subframe configuration of the pico eNB. For example, the incoming HO or call setup to the macro eNB may be suspended by delaying X2 Handover Request Acknowledge or RRC Reconfiguration.

At step 1714, the macro eNB may receive at least one acknowledgement from the second cell. In one configuration, the at least one acknowledgment may confirm that the ABS configuration of the second cell has changed. For example, with reference to FIG. 15 the at least one acknowledgement may be a HetNet Resource Acknowledge message (e.g., HetNet Resource Acknowledge 1524) received from a pico eNB (e.g., Pico eNB 1 1506).

Finally, at step 1716, the macro eNB adjusts a first ABS configuration based on the wireless communication feature and the at least one acknowledgement. The macro eNB may adjust the first ABS configuration by setting a maximum limit on a number of ABS subframes or by setting a minimum limit on a number of non-ABS subframes based on the wireless communication feature. In an aspect, the adjustment may be performed by setting ABS locations based on a bitmap. For example, the first ABS configuration may be represented by an 8-bit bitmap. In an aspect, each bit of the 8-bit bitmap corresponds to a subframe in a sequence of eight subframes. In such aspect, a '0' in the bitmap may indicate that a corresponding subframe is an ABS subframe and is not available for scheduling, and a '1' in the bitmap may indicate that a corresponding subframe is a non-ABS subframe (e.g., a subframe unavailable for eICIC) and is available for scheduling. For example, the ABS locations may include at least four consecutive ABS subframes when the wireless communication feature involves DRX. As another example, the ABS locations may relate to a specific pattern when the wireless communication feature involves TTI bundling.

For example, when the wireless communication feature is the DRX feature with a DRX period of approximately 20.0 ms, the macro eNB may adjust the first ABS configuration such that two of every eight consecutive subframes are allocated as subframes and, therefore, a maximum of six subframes of every eight consecutive subframes are ABS subframes. Accordingly, the 8-bit bitmap may be indicated as '1100 0000'. Alternatively, the 8-bit bitmap may be modified by shifting the eight bits, such that the 8-bit bitmap is indicated as '0011 0000'. In another configuration, the first ABS configuration may be represented by a 40-bit bitmap. For example, the previously discussed 8-bit bitmap (e.g., '1100 0000') may be repeated five times to generate the 40-bit bitmap. Therefore, such 40-bit bitmap may represent an ABS configuration pattern where the first two subframes in each set of 40 subframes are non-ABS subframes.

As another example, and as previously discussed with respect to example configurations of FIGS. 8 through 11, when the wireless communication feature is the TTI bundling feature, the macro eNB may adjust the first ABS configuration such that four of every eight consecutive subframes are allocated as 'U' subframes and, therefore, a maximum of four of every eight consecutive subframes are ABS subframes. In another configuration, the macro eNB may adjust the first ABS configuration by allocating a predetermined number of subframes as non-ABS subframes. For example, the predetermined number may be equal to or greater than the minimum limit on the number of non-ABS subframes. In yet another configuration, the macro eNB may adjust the first ABS configuration based on a minimum number of the UEs using the wireless communication feature, such that a number of subframes are configured as non-ABS subframes as a function of the number of the UEs as previously discussed with respect to Table 2.

It should be understood that the steps 1710 and 1712 indicated with dotted lines in FIG. 17 represent optional steps. For example, in one embodiment, steps 1702, 1704, 1708, 1710, 1714, and 1716 may be performed without performing step 1712. As another example, in one embodiment, steps 1702, 1704, 1708, 1712, 1714, and 1716 may be performed without performing step 1710.

Figure 18:
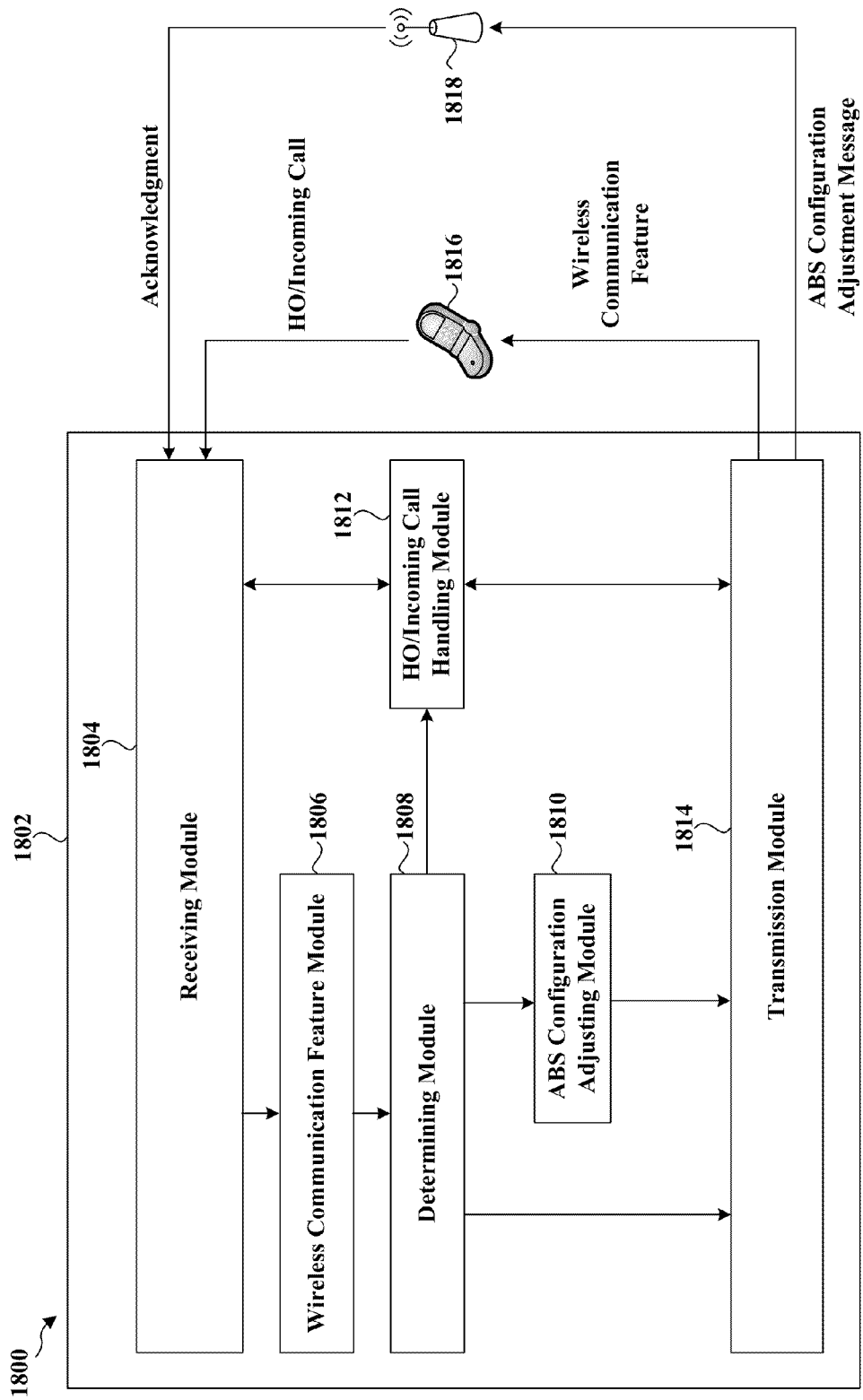
FIG. 18 is a conceptual data flow diagram illustrating the data flow between different modules/means/components in an exemplary apparatus.

FIG. 18 is a conceptual data flow diagram 1800 illustrating the data flow between different modules/means/components in an exemplary apparatus 1802. The apparatus may be a macro eNB. The apparatus includes a receiving module 1804, a wireless communication feature module 1806, a determining module 1808, an ABS configuration adjusting module 1810, an HO/incoming call handling module 1812, and a transmission module 1814.

The receiving module 1804 receives at least one acknowledgement from the second cell (e.g., pico eNB 1818). In one configuration, the at least one acknowledgment may confirm that the ABS configuration of the pico eNB 1818 has changed. The receiving module 1804 also receives an HO or incoming call from the UE 1816.

The wireless communication feature module 1806 initiates or terminates a wireless communication feature. In one configuration, the wireless communication feature may be related to a VoLTE service, such as DRX, SPS, and/or TTI bundling.

The determining module 1808 determines whether a first ABS configuration implemented by the apparatus 1802 can support the initiated wireless communication feature. For example, if the wireless communication feature is TTI bundling and the first ABS configuration does not allocate at least four consecutive non-ABS subframes as needed by the TTI bundling feature, then the determining module 1808 may determine that the first ABS configuration cannot support the TTI bundling feature.

The ABS configuration adjusting module 1810 adjusts a first ABS configuration based on the wireless communication feature. The ABS configuration adjusting module 1810 may adjust the first ABS configuration by setting a maximum limit on a number of ABS subframes or by setting a minimum limit on a number of non-ABS subframes based on the wireless communication feature. In one configuration, the first ABS configuration may be represented by a 40-bit bitmap. In another configuration, the first ABS configuration may be represented by an 8-bit bitmap. For example, when the wireless communication feature is the DRX feature with a DRX period of approximately 20.0 ms, the ABS configuration adjusting module 1810 may adjust the first ABS configuration such that two of every eight consecutive subframes are allocated as 'U' subframes and, therefore, a maximum of six subframes of every eight consecutive subframes are ABS subframes. As another example, when the wireless communication feature is the TTI bundling feature, the ABS configuration adjusting module 1810 may adjust the first ABS configuration such that four of every eight consecutive subframes are allocated as 'U' subframes and, therefore, a maximum of four of every eight consecutive subframes are ABS subframes. In another configuration, the ABS configuration adjusting module 1810 may adjust the first ABS configuration by allocating a predetermined number of subframes as non-ABS subframes. For example, the predetermined number may be equal to or greater than the minimum limit on the number of non-ABS subframes. In yet another configuration, the ABS configuration adjusting module 1810 may adjust the first ABS configuration based on a number of the UEs using the wireless communication feature, such that a number of subframes are configured as non-ABS subframes as a function of the number of the UEs as previously discussed with respect to Table 2.

The HO/incoming call handling module 1812 optimistically accepts an incoming HO or call setup to the apparatus 1802 while the 'AC' subframes are being negotiated, that is, before the second ABS configuration of a second cell (e.g., pico eNB 1818) has been adjusted. The HO/incoming call handling module 1812 may also suspend an incoming HO or call setup to the apparatus 1802 until a second cell (e.g., pico eNB 1818) confirms the change in the ABS subframe configuration of the second cell.

The transmission module 1814 sends a message for adjusting a second ABS configuration at a second cell (e.g., pico eNB 1818) based on the wireless communication feature. For example, the message may be a HetNet Resource Request message. In one configuration, the message is sent during a predetermined period of an ABS configuration adjustment cycle. In another configuration, the message is sent asynchronously. The transmission module 1814 also provides one or more wireless communication features to the UE 1816.

The apparatus may include additional modules that perform each of the steps of the algorithm in the aforementioned flow charts of FIGS. 16 and 17. As such, each step in the aforementioned flow charts of FIGS. 16 and 17 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 19:
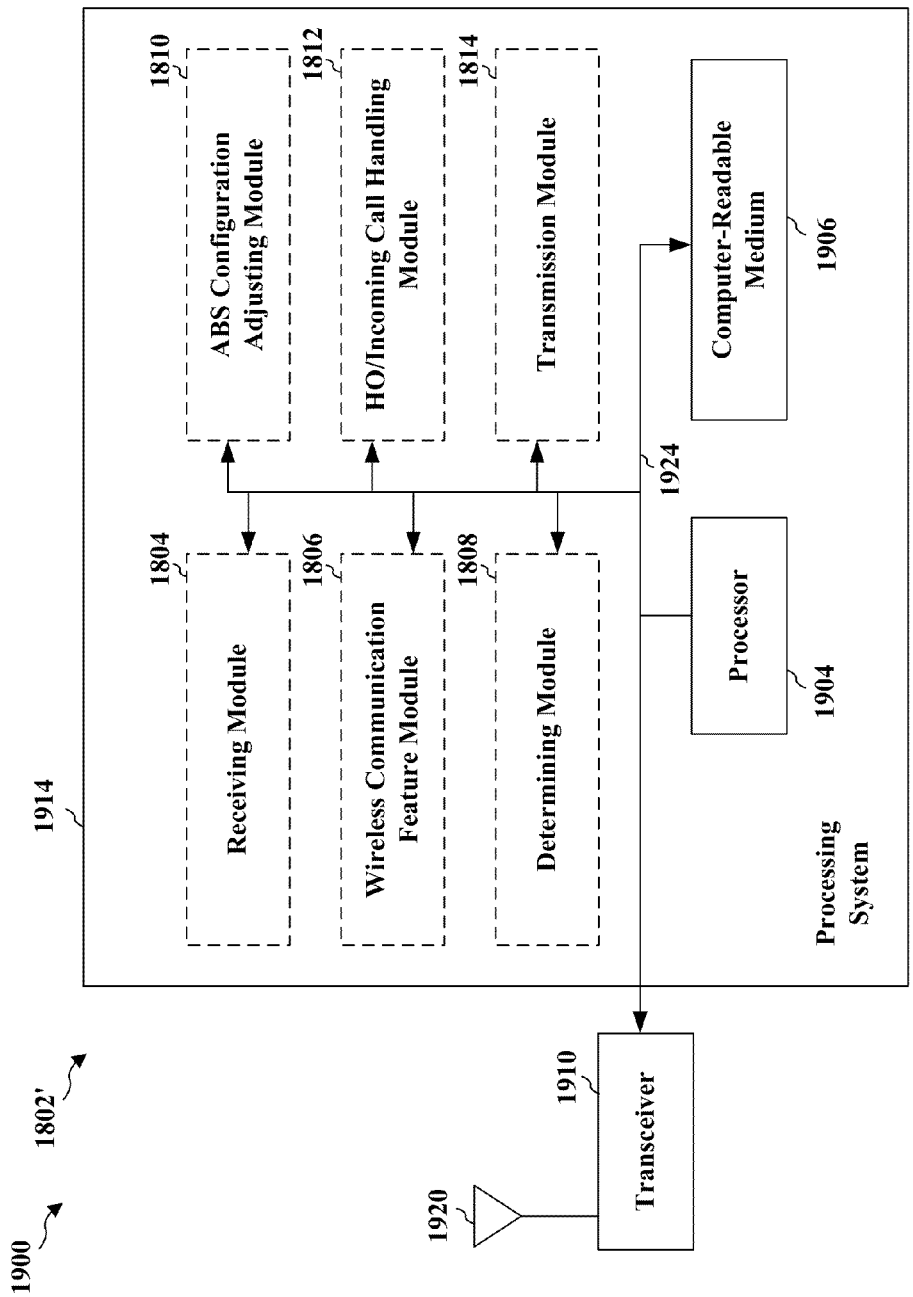
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware modules, represented by the processor 1904, the modules 1804, 1806, 1808, 1810, 1812, and 1814 and the computer-readable medium 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The processing system 1914 includes a processor 1904 coupled to a computer-readable medium 1906. The processor 1904 is responsible for general processing, including the execution of software stored on the computer-readable medium 1906. The software, when executed by the processor 1904, causes the processing system 1914 to perform the various functions described supra for any particular apparatus. The computer-readable medium 1906 may also be used for storing data that is manipulated by the processor 1904 when executing software. The processing system further includes at least one of the modules 1804, 1806, 1808, 1810, 1812, and 1814. The modules may be software modules running in the processor 1904, resident/stored in the computer readable medium 1906, one or more hardware modules coupled to the processor 1904, or some combination thereof. The processing system 1914 may be a component of the eNB 610 and may include the memory 676 and/or at least one of the TX processor 616, the RX processor 670, and the controller/processor 675.

In one configuration, the apparatus 1802/1802' for wireless communication includes means for initiating or terminating support for a wireless communication feature, means for adjusting a first almost blank subframe (ABS) configuration based on the wireless communication feature, means for determining that the first ABS configuration cannot support the wireless communication feature, means for sending a message for adjusting a second ABS configuration at a second cell based on the wireless communication feature, means for receiving at least one acknowledgment from the second cell, wherein the adjusting is further based on the at least one acknowledgment, means for suspending an incoming handover of the UE or an incoming call from the UE until a confirmation is received from the second cell, the confirmation indicating that the second ABS configuration has been adjusted, and means for accepting an incoming handover of the UE or an incoming call from the UE before the second ABS configuration of the second cell has been adjusted.

The aforementioned means may be one or more of the aforementioned modules of the apparatus 1802 and/or the processing system 1914 of the apparatus 1802' configured to perform the functions recited by the aforementioned means. As described supra, the processing system 1914 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication comprising:
    initiating or terminating support for a wireless communication feature at a first cell;
    determining whether a first almost blank subframe (ABS) configuration at the first cell supports the wireless communication feature, wherein the determining comprises determining if a predetermined number of non-ABS subframes are available to support the wireless communication feature; and
    adjusting the first ABS configuration at the first cell to be aligned with the predetermined number of non-ABS subframes based on the wireless communication feature, the adjusting comprising setting a maximum limit on a number of ABS subframes or a minimum limit on a number of non-ABS subframes based on the wireless communication feature.

2. The method of claim 1, wherein the adjusting further comprises setting ABS locations based on a bitmap.

3. The method of claim 2, wherein:
    the ABS locations comprise at least four consecutive ABS subframes when the wireless communication feature comprises discontinuous reception (DRX); and
    the ABS locations relate to a specific pattern when the wireless communication feature comprises transmission time interval (TTI) bundling.

4. The method of claim 1, wherein the initiating or terminating support for the wireless communication feature is based on a presence or absence of a user equipment (UE).

5. The method of claim 1, further comprising determining that the first ABS configuration cannot support the wireless communication feature.

6. The method of claim 1, further comprising sending a message for adjusting a second ABS configuration at a second cell based on the wireless communication feature.

7. The method of claim 1, wherein the adjusting further comprises configuring a predetermined number of subframes as non-ABS subframes.

8. The method of claim 1, wherein the adjusting is further based on a minimum number of UEs using the wireless communication feature, wherein the adjusting further comprises configuring a number of subframes as non-ABS subframes as a function of the number of the UEs.

9. The method of claim 6, further comprising receiving at least one acknowledgment from the second cell, wherein the adjusting is further based on the at least one acknowledgment.

10. The method of claim 6, wherein the message is sent during a predetermined period of an ABS configuration adjustment cycle.

11. The method of claim 6, wherein the message is sent asynchronously.

12. The method of claim 6, further comprising suspending an incoming handover of a UE or an incoming call from the UE until a confirmation is received from the second cell, the confirmation indicating that the second ABS configuration has been adjusted.

13. The method of claim 6, further comprising accepting an incoming handover of a UE or an incoming call from the UE before the second ABS configuration of the second cell has been adjusted.

14. The method of claim 1, wherein the wireless communication feature is related to a voice over Internet Protocol (VoIP) service.

15. The method of claim 1, wherein the wireless communication feature is one of transmission time interval (TTI) bundling, discontinuous reception (DRX), or semi-persistent scheduling (SPS).

16. The method of claim 15, wherein:
    the maximum limit on the number of ABS subframes is set to six if the wireless communication feature is the DRX; and
    the maximum limit on the number of ABS subframes is set to four if the wireless communication feature is the TTI bundling.

17. An apparatus for wireless communication, comprising:
    means for initiating or terminating support for a wireless communication feature at a first cell;
    means for determining whether a first almost blank subframe (ABS) configuration at the first cell supports the wireless communication feature, wherein the determining comprises determining if a predetermined number of non-ABS subframes are available to support the wireless communication feature; and
    means for adjusting the first ABS configuration to be aligned with the predetermined number of non-ABS subframes based on the wireless communication feature at the first cell, the adjusting comprising setting a maximum limit on a number of ABS subframes or a minimum limit on a number of non-ABS subframes based on the wireless communication feature.

18. The apparatus of claim 17, wherein the adjusting further comprises setting ABS locations based on a bitmap.

19. The apparatus of claim 18, wherein:
    the ABS locations comprise at least four consecutive ABS subframes when the wireless communication feature comprises discontinuous reception (DRX); and
    the ABS locations relate to a specific pattern when the wireless communication feature comprises transmission time interval (TTI) bundling.

20. The apparatus of claim 17, wherein the initiating or terminating support for the wireless communication feature is based on a presence or absence of a user equipment (UE).

21. The apparatus of claim 17, further comprising means for determining that the first ABS configuration cannot support the wireless communication feature.

22. The apparatus of claim 17, further comprising means for sending a message for adjusting a second ABS configuration at a second cell based on the wireless communication feature.

23. The apparatus of claim 17, wherein the adjusting further comprises configuring a predetermined number of subframes as non-ABS subframes.

24. The apparatus of claim 17, wherein the adjusting is further based on a minimum number of UEs using the wireless communication feature, wherein the adjusting further comprises configuring a number of subframes as non-ABS subframes as a function of the number of the UEs.

25. The apparatus of claim 22, further comprising means for receiving at least one acknowledgment from the second cell, wherein the adjusting is further based on the at least one acknowledgment.

26. The apparatus of claim 22, wherein the message is sent during a predetermined period of an ABS configuration adjustment cycle.

27. The apparatus of claim 22, wherein the message is sent asynchronously.

28. The apparatus of claim 22, further comprising means for suspending an incoming handover of a UE or an incoming call from the UE until a confirmation is received from the second cell, the confirmation indicating that the second ABS configuration has been adjusted.

29. The apparatus of claim 22, further comprising means for accepting an incoming handover of a UE or an incoming call from the UE before the second ABS configuration of the second cell has been adjusted.

30. The apparatus of claim 17, wherein the wireless communication feature is related to a voice over Internet Protocol (VoIP) service.

31. The apparatus of claim 17, wherein the wireless communication feature is one of transmission time interval (TTI) bundling, discontinuous reception (DRX), or semi-persistent scheduling (SPS).

32. The apparatus of claim 31, wherein:
the maximum limit on the number of ABS subframes is set to six if the wireless communication feature is the DRX; and
the maximum limit on the number of ABS subframes is set to four if the wireless communication feature is the TTI bundling.

33. An apparatus for wireless communication, comprising:
a processing system; and
a memory storing instructions, that when, executed cause the processing system to:
initiate or terminate support for a wireless communication feature at a first cell;
determine whether a first almost blank subframe (ABS) configuration at the first cell supports the wireless communication feature, wherein the determining comprises determining if a predetermined number of non-ABS subframes are available to support the wireless communication feature; and
adjust the first ABS configuration to be aligned with the predetermined number of non-ABS subframes based on the wireless communication feature at the first cell, the adjustment comprising setting a maximum limit on a number of ABS subframes or a minimum limit on a number of non-ABS subframes based on the wireless communication feature.

34. The apparatus of claim 33, wherein the initiating or terminating support for the wireless communication feature is based on a presence or absence of a user equipment (UE).

35. The apparatus of claim 33, wherein the adjusting further comprises setting ABS locations based on a bitmap.

36. The apparatus of claim 35, wherein:
the ABS locations comprise at least four consecutive ABS subframes when the wireless communication feature comprises discontinuous reception (DRX); and
the ABS locations relate to a specific pattern when the wireless communication feature comprises transmission time interval (TTI) bundling.

37. The apparatus of claim 33, wherein the processing system is further configured to determine that the first ABS configuration cannot support the wireless communication feature.

38. The apparatus of claim 33, wherein the processing system is further configured to send a message to adjust a second ABS configuration at a second cell based on the wireless communication feature.

39. The apparatus of claim 33, wherein the adjustment further comprises configuring a predetermined number of subframes as non-ABS subframes.

40. The apparatus of claim 33, wherein the adjustment is further based on a minimum number of UEs using the wireless communication feature, wherein the adjustment further comprises configuring a number of subframes as non-ABS subframes as a function of the number of the UEs.

41. The apparatus of claim 33, wherein the processing system is further configured to receive at least one acknowledgment from a second cell, wherein the adjustment is further based on the at least one acknowledgment.

42. The apparatus of claim 38, wherein the message is sent during a predetermined period of an ABS configuration adjustment cycle.

43. The apparatus of claim 38, wherein the message is sent asynchronously.

44. The apparatus of claim 38, wherein the processing system is further configured to suspend an incoming handover of a UE or an incoming call from the UE until a confirmation is received from the second cell, the confirmation indicating that the second ABS configuration has been adjusted.

45. The apparatus of claim 38, wherein the processing system is further configured to accept an incoming handover of a UE or an incoming call from the UE before the second ABS configuration of the second cell has been adjusted.

46. The apparatus of claim 33, wherein the wireless communication feature is related to a voice over Internet Protocol (VoIP) service.

47. The apparatus of claim 33, wherein the wireless communication feature is one of transmission time interval (TTI) bundling, discontinuous reception (DRX), or semi-persistent scheduling (SPS).

48. The apparatus of claim 47, wherein:
the maximum limit on the number of ABS subframes is set to six if the wireless communication feature is the DRX; and
the maximum limit on the number of ABS subframes is set to four if the wireless communication feature is the TTI bundling.

49. A non-transitory computer-readable medium comprising code that when executed on at least one processor causes the at least one processor to:
initiate or terminate support for a wireless communication feature at a first cell;
determine whether a first almost blank subframe (ABS) configuration at the first cell supports the wireless communication feature, wherein the determining comprises determining if a predetermined number of non-ABS subframes are available to support the wireless communication feature; and
adjust the first ABS configuration to be aligned with the predetermined number of non-ABS subframes based on the wireless communication feature at the first cell, the adjusting comprising setting a maximum limit on a number of ABS subframes or a minimum limit on a number of non-ABS subframes based on the wireless communication feature.

50. The non-transitory computer-readable medium of claim 49, wherein the adjusting further comprises setting ABS locations based on a bitmap.

51. The non-transitory computer-readable medium of claim 50, wherein:
the ABS locations comprise at least four consecutive ABS subframes when the wireless communication feature comprises discontinuous reception (DRX); and
the ABS locations relate to a specific pattern when the wireless communication feature comprises transmission time interval (TTI) bundling.

52. The non-transitory computer-readable medium of claim 49, wherein the initiating or terminating support for the wireless communication feature is based on a presence or absence of a user equipment (UE).

53. The non-transitory computer-readable medium of claim 49, wherein the computer-readable medium further comprises code for determining that the first ABS configuration cannot support the wireless communication feature.

54. The non-transitory computer-readable medium of claim 49, wherein the computer-readable medium further comprises code for sending a message for adjusting a second ABS configuration at a second cell based on the wireless communication feature.

55. The non-transitory computer-readable medium of claim 49, wherein the adjusting further comprises configuring a predetermined number of subframes as non-ABS subframes.

56. The non-transitory computer-readable medium of claim 49, wherein the adjusting is further based on a number of UEs using the wireless communication feature, wherein the adjusting further comprises configuring a number of subframes as non-ABS subframes as a function of the number of the UEs.

57. The non-transitory computer-readable medium of claim 54, wherein the computer-readable medium further comprises code for receiving at least one acknowledgment from the second cell, wherein the adjusting is further based on the at least one acknowledgment.

58. The non-transitory computer-readable medium of claim 54, wherein the message is sent during a predetermined period of an ABS configuration adjustment cycle.

59. The non-transitory computer-readable medium of claim 54, wherein the message is sent asynchronously.

60. The non-transitory computer-readable medium of claim 54, wherein the computer-readable medium further comprises code for suspending an incoming handover of a UE or an incoming call from the UE until a confirmation is received from the second cell, the confirmation indicating that the second ABS configuration has been adjusted.

61. The non-transitory computer-readable medium of claim 54, wherein the computer-readable medium further comprises code for accepting an incoming handover of a UE or an incoming call from the UE before the second ABS configuration of the second cell has been adjusted.

62. The non-transitory computer-readable medium of claim 49, wherein the wireless communication feature is related to a voice over Internet Protocol (VoIP) service.

63. The non-transitory computer-readable medium of claim 49, wherein the wireless communication feature is one of transmission time interval (TTI) bundling, discontinuous reception (DRX), or semi-persistent scheduling (SPS).

64. The non-transitory computer-readable medium of claim 63, wherein:
the maximum limit on the number of ABS subframes is set to six if the wireless communication feature is the DRX; and
the maximum limit on the number of ABS subframes is set to four if the wireless communication feature is the TTI bundling.

* * * * *